United States Patent
Pronovici et al.

(10) Patent No.: US 12,521,558 B2
(45) Date of Patent: Jan. 13, 2026

(54) ADJUSTMENT OF MECHANICAL MOTION SENSING FOR CONTROLLING CARDIAC PACING

(71) Applicant: Medtronic, Inc., Minneapolis, MN (US)

(72) Inventors: Juliana E. Pronovici, New Hope, MN (US); James W. Busacker, St. Anthony, MN (US); Tolulope M. Ayodele, New Hope, MN (US); Yi Tong Kan, Allston, MA (US)

(73) Assignee: Medtronic, Inc., Minneapolis, MN (US)

( * ) Notice: Subject to any disclaimer, the term of this patent is extended or adjusted under 35 U.S.C. 154(b) by 927 days.

(21) Appl. No.: 17/142,420

(22) Filed: Jan. 6, 2021

(65) Prior Publication Data

US 2021/0228886 A1    Jul. 29, 2021

Related U.S. Application Data

(60) Provisional application No. 62/964,984, filed on Jan. 23, 2020.

(51) Int. Cl.
*A61N 1/365* (2006.01)
*A61N 1/37* (2006.01)

(52) U.S. Cl.
CPC ..... *A61N 1/36542* (2013.01); *A61N 1/36578* (2013.01); *A61N 1/3706* (2013.01)

(58) Field of Classification Search
CPC .................................................. A61N 1/36578
See application file for complete search history.

(56) References Cited

U.S. PATENT DOCUMENTS

| | | | |
|---|---|---|---|
| 4,485,813 A | 12/1984 | Anderson et al. | |
| 5,052,388 A | 10/1991 | Sivula et al. | |

(Continued)

FOREIGN PATENT DOCUMENTS

| | | |
|---|---|---|
| WO | 2020/118015 A1 | 6/2020 |
| WO | 2020/118037 A2 | 6/2020 |
| WO | 2020/118039 A1 | 6/2020 |

OTHER PUBLICATIONS

International Search Report and Written Opinion of International Application No. PCT/US2021/013907, mailed Apr. 9, 2021, 12 pp.

*Primary Examiner* — George R Evanisko
(74) *Attorney, Agent, or Firm* — Shumaker & Sieffert, P.A.

(57) ABSTRACT

Techniques are disclosed for adjusting event detection parameters used for sensing mechanical motion data of a heart of a patient for use in cardiac pacing therapy. For example, processing circuitry receives, from a user, an input specifying one or more event detection parameters defining mechanical motion sensing of a heart of a patient by one or more motion sensors of an implantable medical device (IMD). The processing circuitry controls the IMD to perform mechanical motion sensing of the heart of the patient in accordance with the one or more event detection parameters. The processing circuitry obtains mechanical motion data of the heart of the patient sensed in accordance with the one or more event detection parameters. The processing circuitry controls the IMD to deliver cardiac pacing therapy based on the mechanical motion data of the heart of the patient sensed in accordance with the one or more event detection parameters.

25 Claims, 21 Drawing Sheets

(56) References Cited

U.S. PATENT DOCUMENTS

| | | |
|---|---|---|
| 5,507,782 A | 4/1996 | Kieval et al. |
| 5,593,431 A | 1/1997 | Sheldon |
| 5,885,471 A | 3/1999 | Ruben et al. |
| 6,044,297 A | 3/2000 | Sheldon et al. |
| 8,433,409 B2 | 4/2013 | Johnson et al. |
| 8,532,785 B1 | 9/2013 | Crutchfiled et al. |
| 8,541,131 B2 | 9/2013 | Lund et al. |
| 9,775,982 B2 | 10/2017 | Grubac et al. |
| 10,207,116 B2 | 2/2019 | Sheldon et al. |
| 2018/0085588 A1* | 3/2018 | Splett .................. A61N 1/3756 |
| 2018/0085589 A1 | 3/2018 | Splett et al. |
| 2018/0117337 A1 | 5/2018 | Demmer et al. |
| 2018/0161580 A1 | 6/2018 | Demmer et al. |
| 2019/0321634 A1 | 10/2019 | Sheldon et al. |
| 2020/0179701 A1 | 6/2020 | Pronovici et al. |
| 2020/0179707 A1 | 6/2020 | Splett et al. |
| 2020/0179708 A1 | 6/2020 | Splett et al. |

* cited by examiner

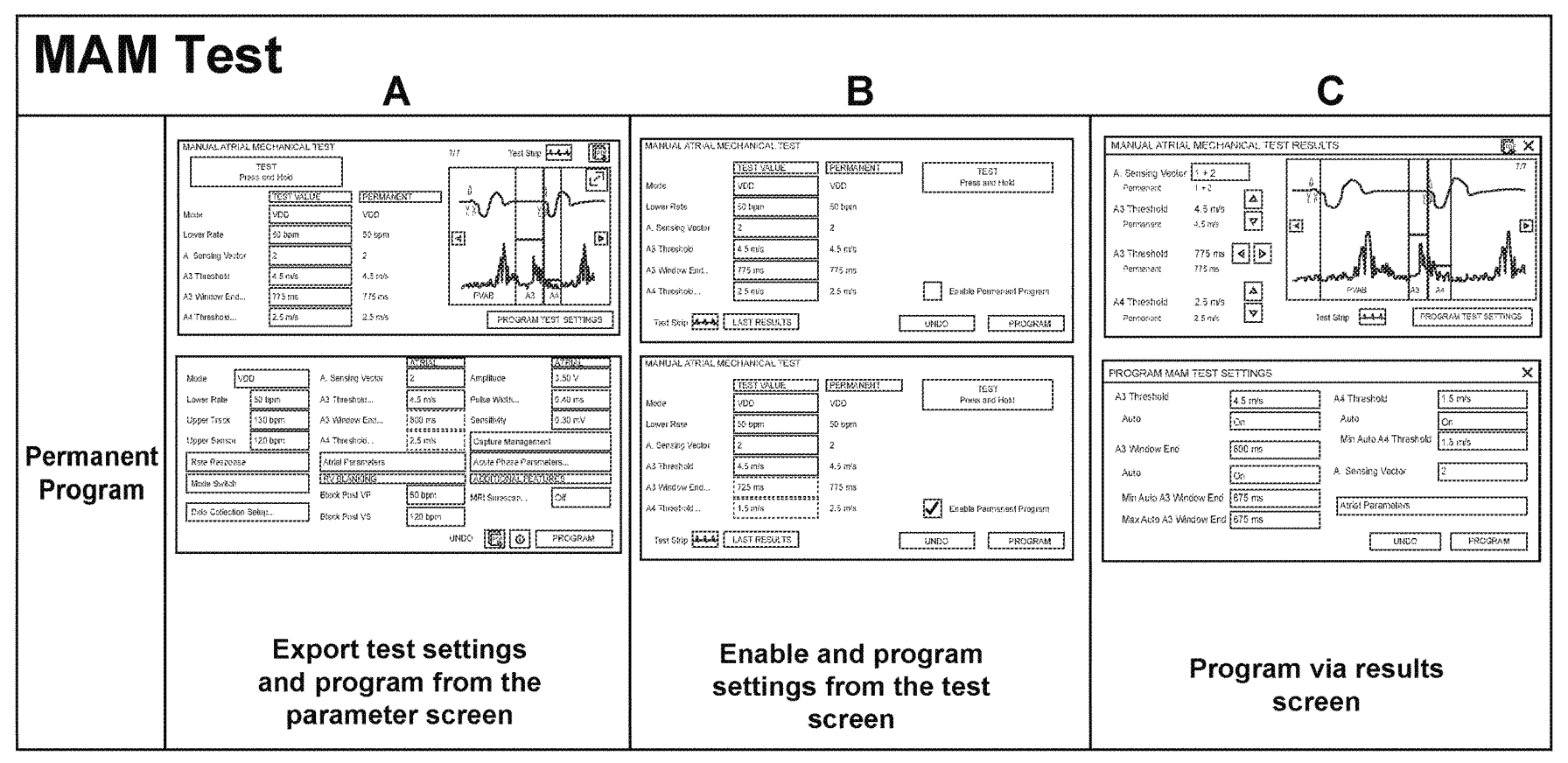

MAM Test

Permanent Program

A — Export test settings and program from the parameter screen

B — Enable and program settings from the test screen

C — Program via results screen

FIG. 14F

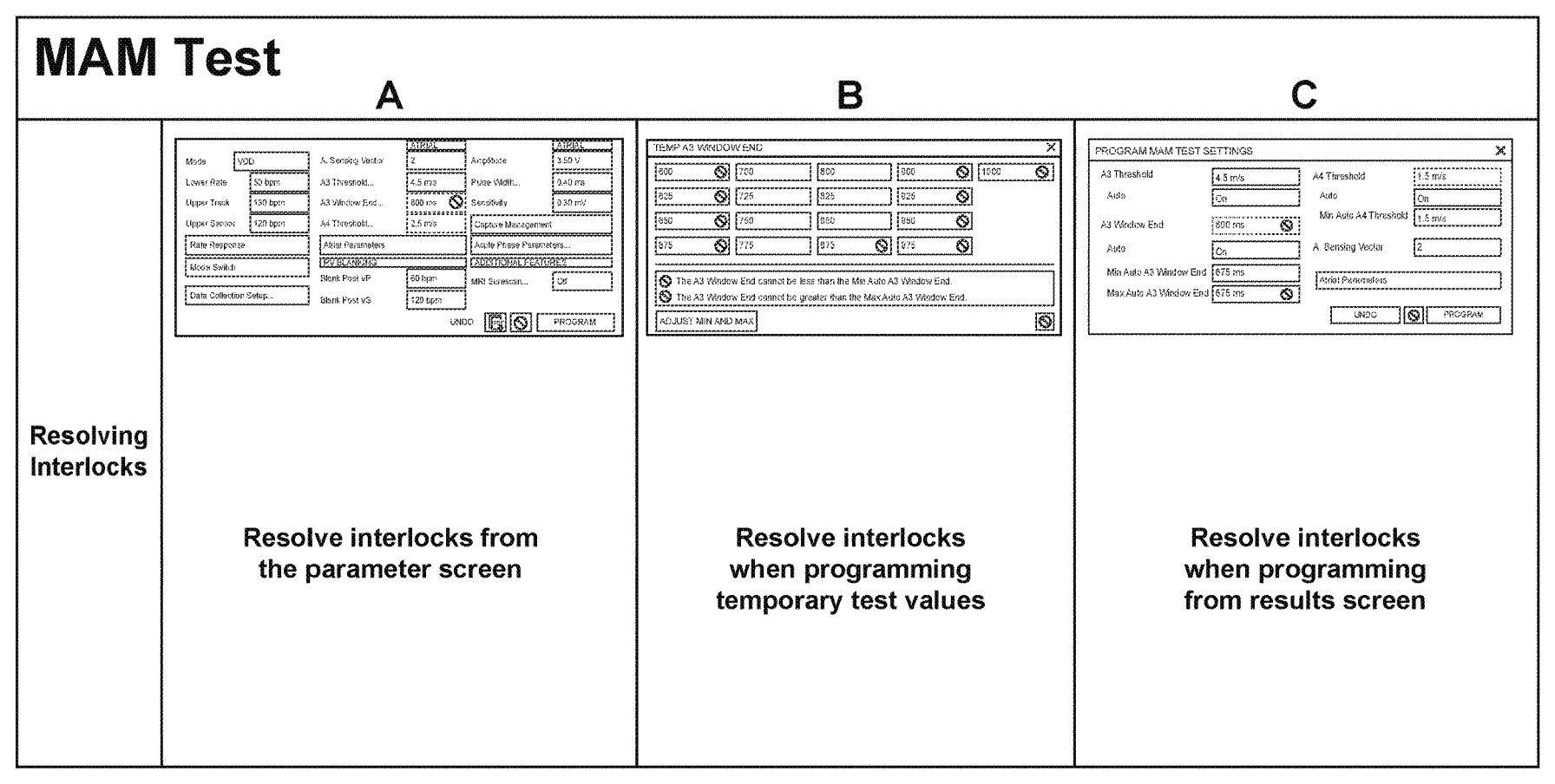

MAM Test

A        B        C

Resolving Interlocks: Resolve interlocks from the parameter screen | Resolve interlocks when programming temporary test values | Resolve interlocks when programming from results screen

FIG. 14G

ADJUSTMENT OF MECHANICAL MOTION SENSING FOR CONTROLLING CARDIAC PACING

This application claims the benefit of U.S. Provisional Application No. 62/964,984, which was filed on Jan. 23, 2020, the entire content of which is incorporated herein by reference.

TECHNICAL FIELD

This disclosure generally relates to medical devices and, more particularly, timing of cardiac pacing by medical devices.

BACKGROUND

Implantable cardiac pacemakers are often placed in a subcutaneous pocket and coupled to one or more transvenous medical electrical leads carrying pacing and sensing electrodes positioned in the heart. A cardiac pacemaker implanted subcutaneously may be a single chamber pacemaker coupled to one transvenous medical lead for positioning electrodes in one heart chamber, atrial or ventricular, or a dual chamber pacemaker coupled to two transvenous, intracardiac leads for positioning electrodes in both an atrial and a ventricular chamber. Multi-chamber pacemakers are also available that may be coupled to three leads, for example, for positioning electrodes for pacing and sensing in one atrial chamber and both the right and left ventricles.

Intracardiac pacemakers have recently been introduced that are implantable within a ventricular chamber of a patient's heart for delivering ventricular pacing pulses. Such a pacemaker may sense R-wave signals attendant to intrinsic ventricular depolarizations and deliver ventricular pacing pulses in the absence of sensed R-waves. While single chamber ventricular sensing and pacing by an intracardiac ventricular pacemaker may adequately address some heart rhythm conditions, some patients may benefit from atrial and ventricular (dual chamber) sensing for providing atrial-synchronized ventricular pacing in order to maintain a more normal heart rhythm.

SUMMARY

In general, the disclosure describes techniques for adjusting event detection parameters used for sensing mechanical motion data of a heart of a patient for use in cardiac pacing therapy. In some examples, an implantable medical device (IMD) performs mechanical motion sensing of the heart of the patient via one or more motion sensors. The mechanical motion sensing may detect, e.g., mechanical motion of the heart. Such mechanical motion of the heart may include events such as an A1 event (e.g., a "ventricular contraction event"), an A2 event (e.g., a "ventricular relaxation event"), an A3 event (e.g., "ventricular passive filling event"), or an A4 event (e.g., an "atrial systolic event" or simply an "atrial event"). In some examples, the IMD may use a detected A4 event as an indicator for controlling the timing of delivery of ventricular pacing pulse delivery. In some examples, and as described in more detail below, an A3 event and an A4 event may occur concurrently such that the A3 event and A4 event may "fuse" into a single event having a greater amplitude than either the A3 event or the A4 event alone. The fused A3/A4 event is referred to herein as an "A7 event" and may also be used for controlling the timing of delivery of ventricular pacing pulse delivery.

A medical device, such as an external programmer, receives an input from a user that specifies one or more event detection parameters. The one or more event detection parameters define the mechanical motion sensing of the heart performed by the IMD. The one or more event detection parameters may specify, for example, a threshold amplitude of a window for sensing an A7 event, a threshold amplitude of a window for sensing an A4 event, a boundary separating the window for sensing the A7 event from the window for sensing an A4 event, an end of the window for sensing an A7 event, or a beginning of the window for sensing an A4 event. The medical device controls the IMD to perform mechanical motion sensing of the heart of the patient in accordance with the one or more event detection parameters. The medical device obtains, from the IMD, mechanical motion data of the heart of the patient sensed in accordance with the one or more event detection parameters and controls the IMD to deliver cardiac pacing therapy based on the mechanical motion data of the heart of the patient sensed in accordance with the one or more event detection parameters.

In some examples, the IMD senses, via one or more electrodes, electrogram data of the heart of the patient. The medical device may display, to the user, a representation of electrocardiogram data of the heart of the patient, a representation of the electrogram data of the heart of the patient, and a representation of the mechanical motion data of the heart of the patient. The medical device may further display, to the user, a representation of the one or more event detection parameters with respect to the representation of the mechanical motion data of the heart of the patient. The user may use such representations for guidance in specifying the one or more event detection parameters defining the mechanical motion sensing of the heart of the patient so as to configure IMD 14 to more accurately detect such mechanical cardiac events.

The techniques of the disclosure provide specific improvements to the computer-related field of programming medical devices that have practical applications. For example, the use of the techniques herein may enable a medical device to generate visualizations of electrocardiogram data, electrogram data, and mechanical motion data of the heart, as well as the event detection parameters that define the mechanical motion sensing performed by an IMD. Such visualizations may enable the medical device of the present disclosure to inform a user as to how the medical device applies the event detection parameters to mechanical motion sensing performed by the IMD. Furthermore, a medical device as described herein may provide an interface that simplifies the configuration of the mechanical sensing by the IMD, thereby reducing the likelihood of human error and increasing the accuracy of the IMD in identifying events within mechanical motion data, such as A3, A4, and A7 events. Furthermore, the techniques of the disclosure may reduce the complexity of programming a medical device to identify events within mechanical motion data to the degree of accuracy required for such mechanical motion data to be used for controlling the delivery and timing of cardiac pacing delivery. Accordingly, the techniques of the disclosure may enable a medical device, such as an IMD, to be programmed to identify events from mechanical motion data in a manner that is simplified, flexible, and patient-specific such that mechanical motion data may be used to control delivery and timing of cardiac pacing delivery.

In one example, this disclosure describes a method comprising: receiving, by processing circuitry and from a user, an input specifying one or more event detection parameters defining mechanical motion sensing of a heart of a patient by one or more motion sensors of an implantable medical device (IMD); controlling, by the processing circuitry, the IMD to perform mechanical motion sensing of the heart of the patient in accordance with the one or more event detection parameters; and obtaining, by the processing circuitry, mechanical motion data of the heart of the patient sensed in accordance with the one or more event detection parameters.

In another example, this disclosure describes a medical device comprising processing circuitry configured to: receive, from a user, an input specifying one or more event detection parameters defining mechanical motion sensing of a heart of a patient by one or more motion sensors of an implantable medical device (IMD); control the IMD to perform mechanical motion sensing of the heart of the patient in accordance with the one or more event detection parameters; and obtain mechanical motion data of the heart of the patient sensed in accordance with the one or more event detection parameters.

In another example, this disclosure describes a non-transitory, computer-readable medium comprising instructions that, when executed, are configured to cause processing circuitry to: receive, from a user, an input specifying one or more event detection parameters defining mechanical motion sensing of a heart of a patient by one or more motion sensors of an implantable medical device (IMD); control the IMD to perform mechanical motion sensing of the heart of the patient in accordance with the one or more event detection parameters; and obtain mechanical motion data of the heart of the patient sensed in accordance with the one or more event detection parameters.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Figure 14B:
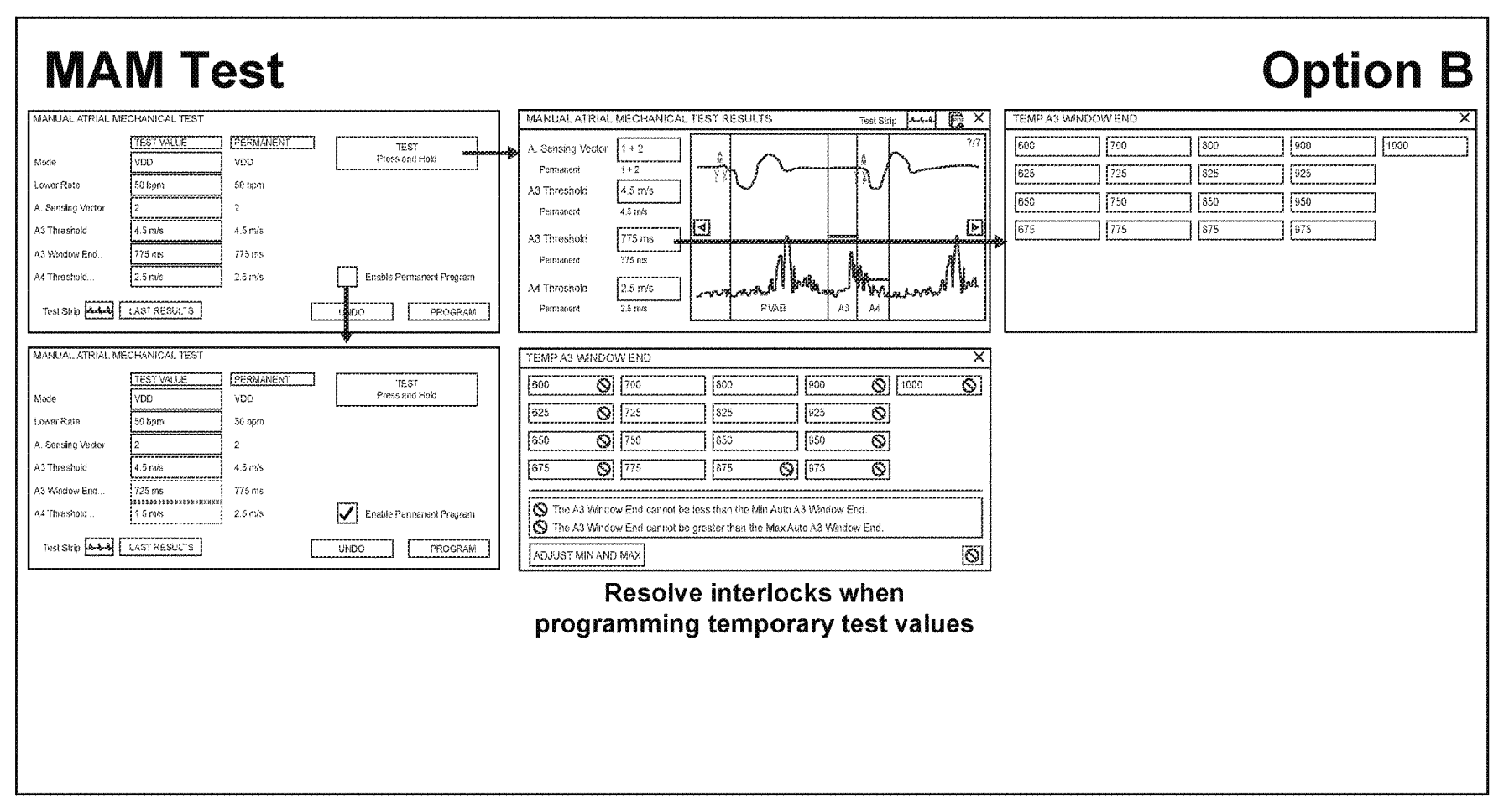
Figure 14D:
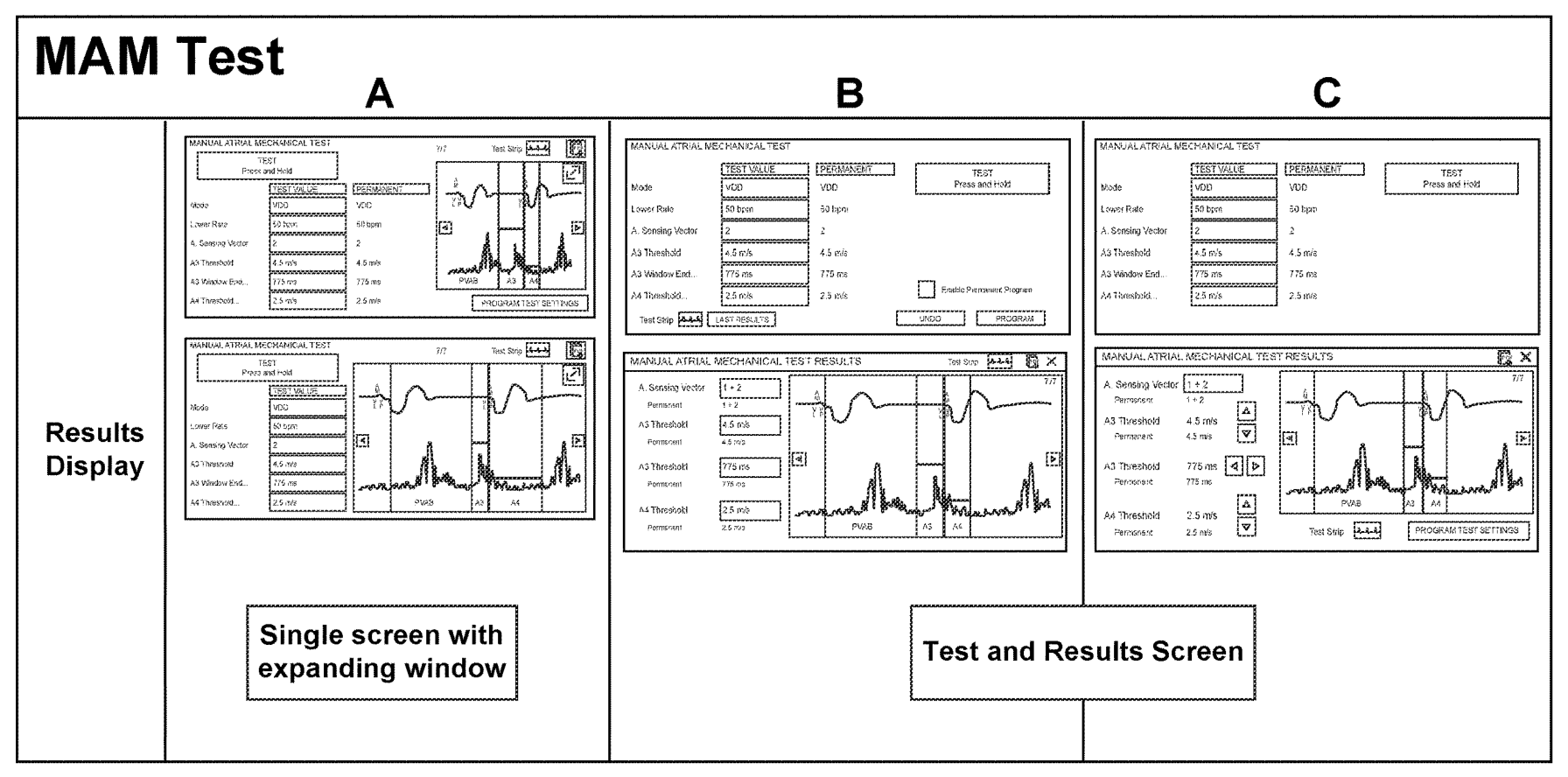

FIGS. 14A-14G are illustrations depicting another example user interface for adjusting one or more event detection parameters defining mechanical motion sensing of a heart of a patient in accordance with the techniques of the disclosure.

Like reference characters refer to like elements throughout the figures and description.

DETAILED DESCRIPTION

In general, this disclosure describes techniques for adjusting event detection parameters used for sensing mechanical motion data of a heart of a patient for use in cardiac pacing therapy. In the illustrative examples presented herein, an IMD, such as an intracardiac ventricular pacemaker, is configured to sense one or more A4 events (also referred to herein as "atrial systolic events") for synchronizing ventricular pacing pulses delivered by the IMD to an atrial rate of the heart of the patient. As described below, the IMD may identify atrial systolic events from a signal produced by a motion sensor. For example, the motion sensor may produce a signal indicative of mechanical motion of the heart of the patient. Such mechanical motion of the heart of the patient may include a number of different types of events, such as an A1 event (e.g., a "ventricular contraction event"), an A2 event (e.g., a "ventricular relaxation event"), an A3 event (e.g., "ventricular passive filling event"), or an A4 event (e.g., an "atrial systolic event" or simply an "atrial event"). The A4 event, or atrial systolic event, corresponds to atrial mechanical contraction and an active filling phase of the ventricle, sometimes referred to as the "atrial kick." In other examples, the IMD may perform atrial systolic event sensing using other techniques, such as sensing the atrial systolic event from another cardiac mechanical motion signal (e.g., a pressure signal, acoustical signal, impedance signal, etc.) or sensing a P-wave of electrogram data that is attendant to atrial depolarization. The IMD maintains a target atrioventricular (AV) interval between detected atrial systolic events and ventricular pacing pulses delivered by the IMD so as to promote synchrony between atrial activation and ventricular activation.

The techniques disclosed herein enable a medical device, such as an external programmer, to adjust event detection parameters that define the mechanical motion sensing of the heart performed by the IMD based on input from a user. The one or more event detection parameters may specify, for example, a threshold amplitude of a window for sensing an A7 event, a threshold amplitude of a window for sensing an A4 event, a boundary separating the window for sensing an A7 event from the window for sensing an A4 event, an end of the window for sensing an A7 event, or a beginning of the window for sensing an A4 event. The techniques of the disclosure may enable the medical device to be programmed to identify events from mechanical motion data in a manner that is simplified, flexible, and patient-specific such that sensed mechanical motion data is of an accuracy suitable for controlling delivery and timing of cardiac pacing delivery.

Figure 1:
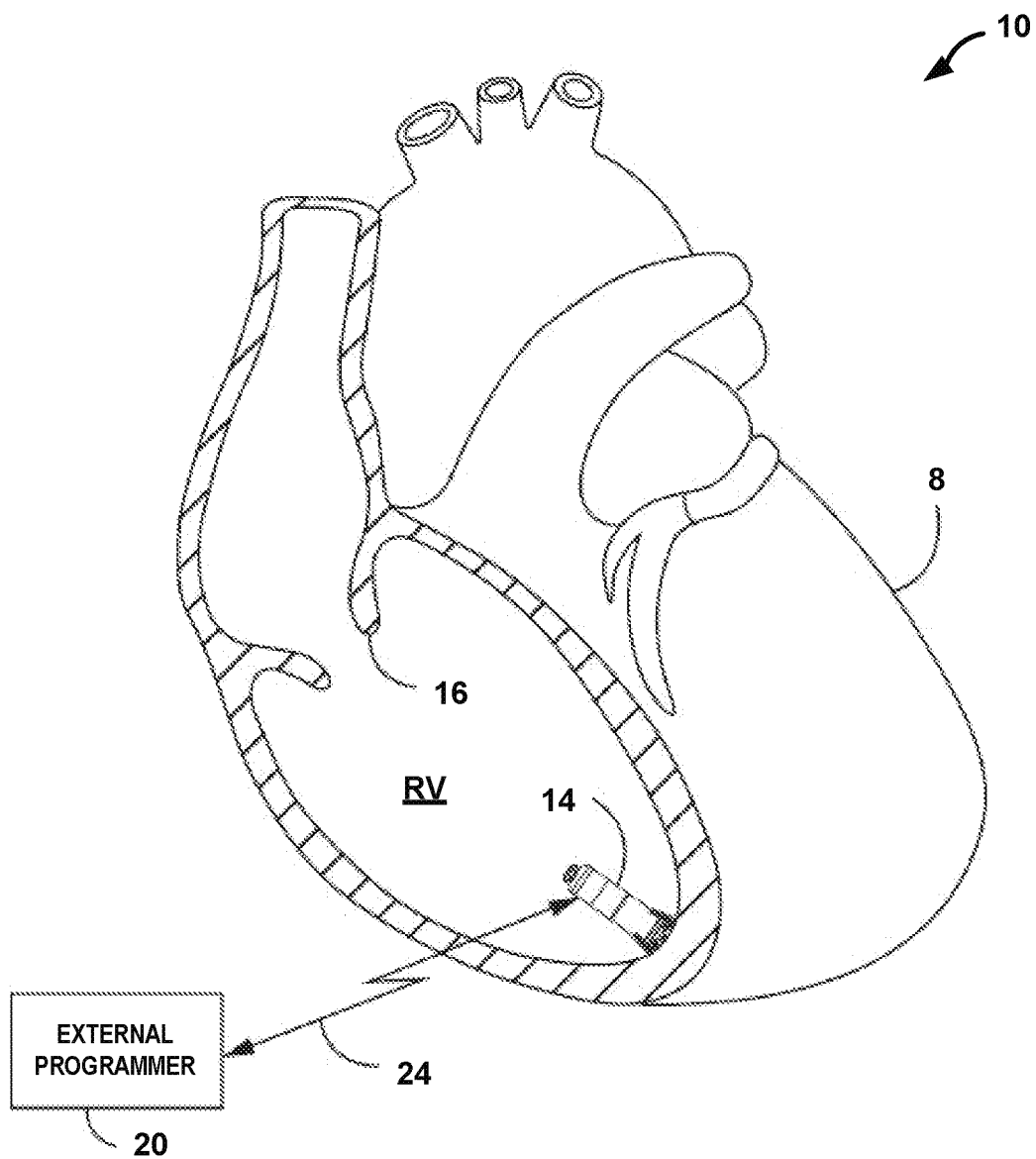
FIG. 1 is a conceptual diagram illustrating a medical device system that may be used to sense electrogram data and mechanical motion data induced by cardiac motion and flowing blood and provide pacing therapy to a heart of a patient in accordance with the techniques of the disclosure.

FIG. 1 is a conceptual diagram illustrating an medical device system 10 that may be used to sense electrogram data and mechanical motion data induced by cardiac motion and flowing blood and provide pacing therapy to heart 8 of a patient in accordance with the techniques of the disclosure. Medical device system 10 includes IMD 14 and external programmer 20.

As depicted in the example of FIG. 1, IMD 14 is a right ventricular (RV) intracardiac pacemaker (referred to herein as "IMD 14" or "pacemaker 14"). For example, IMD 14 is a transcatheter intracardiac pacemaker which is adapted for implantation wholly within a heart chamber, e.g., wholly within the RV or wholly within the left ventricle (LV) of heart 8 for sensing cardiac signals and delivering ventricular pacing pulses. Pacemaker 14 is reduced in size compared to subcutaneously implanted pacemakers and may be generally cylindrical in shape to enable transvenous implantation via a delivery catheter. However, in other examples of the techniques of the disclosure, medical device system 10 may include other types of IMDs in addition to or in the alternative to an RV intracardiac pacemaker not expressly described herein.

As depicted in the example of FIG. 1, IMD 14 is positioned along an endocardial wall of the RV, e.g., near the RV apex. The techniques disclosed herein are not limited to the location of IMD 14 shown in the example of FIG. 1 and IMD 14 may be implanted at other positions within heart 8. For example, a ventricular intracardiac pacemaker may be positioned in the LV and configured to detect mechanical motion of heart 8 and deliver atrial-synchronized ventricular pacing to the LV using the techniques disclosed herein. IMD 14 may be positioned within the right ventricle or left ventricle to provide respective right ventricular or left ventricular pacing and for sensing mechanical motion signals by a motion sensor within the ventricular chamber.

IMD 14 is capable of producing electrical stimulation pulses, e.g., pacing pulses, delivered to heart 8 via one or more electrodes on the outer housing of IMD 14. IMD 14 is configured to deliver RV pacing pulses and sense an RV from electrogram data sensed via housing based electrodes for producing an RV electrogram (EGM) signal. The electrogram data may be sensed using the housing based electrodes that are also used to deliver pacing pulses to the RV.

IMD 14 is configured to control delivery of ventricular pacing pulses to the RV in a manner that promotes synchrony between atrial activation and ventricular activation, e.g., by maintaining a target AV interval between atrial systolic events and delivered ventricular pacing pulses. That is, IMD 14 controls a timing of pacing pulse delivery to maintain a desired AV interval between atrial contractions corresponding to atrial systole and ventricular pacing pulses delivered to cause ventricular depolarization and ventricular systole.

As described herein, IMD 14 detects atrial systolic events producing the active ventricular filling phase via one or more motion sensors, such as one or more accelerometers enclosed by the housing of IMD 14. The mechanical motion signal produced by an accelerometer implanted within the RV includes mechanical motion signals caused by ventricular and atrial systolic events. As non-limiting examples, IMD 14 detects, via one or more accelerometers, acceleration of blood flowing into the RV through the tricuspid valve 16 between the RA and RV, motion of the walls of the heart, and/or pressure waves through the heart caused by atrial systole. These factors and others not expressly identified herein may contribute to the mechanical motion sensed by the accelerometer. IMD 14 may detect other mechanical motion events, such as motion caused by ventricular contraction, motion caused by ventricular relaxation, and motion caused by passive filling of the ventricle as described in more detail below with respect to FIG. 5.

In other examples, IMD 14 may sense atrial systolic events by sensing atrial P-waves that are attendant to atrial depolarizations. P-waves are relatively low amplitude signals in the near-field RV electrical signal received by IMD 14 (e.g., compared to the near-field R-waves) and therefore may be difficult to consistently detect from electrogram data acquired by IMD 14 when IMD 14 is implanted within a ventricular chamber. IMD 14 may not provide reliable atrial-synchronized ventricular pacing where IMD 14 uses solely electrogram sensing to control such ventricular pacing. As described herein, IMD 14 includes a motion sensor, such as an accelerometer, and is configured to use a signal from the motion sensor to detect an atrial systolic event corresponding to atrial mechanical activation or atrial systole. However, in other examples, IMD 15 may use other types of sensors of cardiac mechanical or hemodynamic function to produce a cardiac mechanical motion signal and sense atrial systolic events from the cardiac mechanical motion signal. Such sensors may include, e.g., impedance sensors (which produce a signal correlated to blood volume in the ventricle), pressure sensors, acoustical sensors or other sensors that produce a signal correlated to the mechanical contractions of the heart chambers.

IMD 14 maintains a target AV interval between a detected atrial systolic event and ventricular pacing pulses delivered by the IMD so as to promote synchrony between atrial activation and ventricular activation. As described below, IMD 14 detects the atrial systolic event from a mechanical motion signal and sets a programmable AV pacing interval that controls the timing of the ventricular pacing pulse relative to the detected atrial systolic event. As described below, IMD 14 may detect the atrial systolic event used to synchronize ventricular pacing pulses to atrial systole by detecting other cardiac mechanical motion signals to positively identify the atrial systolic event and/or set sensing parameters used for discriminating the atrial systolic event from other cardiac motion events.

Medical device system 10 may receive, from a clinician, a selection of a target AV interval. The target AV interval is the time interval from the detection of the atrial systolic event until delivery of the ventricular pacing pulse. In some examples, the target AV interval starts from a time at which IMD 14 detects the atrial systolic event. In some examples, IMD 10 identifies the target AV interval as starting from a fiducial point of the atrial systolic event signal. A clinician may determine a target AV interval to be hemodynamically optimal for a given patient based on clinical testing or assessments of the patient or based on clinical data from a population of patients. In some examples, IMD 14 may determine the target AV interval to be optimal based on relative timing of electrical and/or mechanical events as identified from electrogram sensing of heart 8 and/or mechanical motion sensing of heart 8 performed by IMD 14. In some examples, external programmer 20 may receive, from a clinician, input specifying the AV interval to be about 10 to 200 milliseconds, in some examples, to control IMD 14 to deliver a ventricular pacing pulse at a time subsequent to one or more atrial systolic events by a target AV interval, the one or more atrial systolic events identified from the mechanical motion data. In this fashion, IMD may deliver ventricular pacing pulses so as to promote synchrony between atrial activation and ventricular activation.

In some examples, IMD 14 is capable of bidirectional wireless communication with external programmer 20 for programming the AV pacing interval and other pacing control parameters as well as both electrical and mechanical event sensing parameters utilized for detecting ventricular events and the atrial systolic events from electrogram data and/or mechanical motion data. Aspects of external programmer 20 may generally correspond to the external programming/monitoring unit disclosed in U.S. Pat. No. 5,507,782 to Kieval, et al., entitled "Method and apparatus for dual chamber cardiac pacing," filed on Mar. 17, 1994 and issued on Apr. 16, 1996, the entire contents of which is incorporated herein by reference. External programmer 20 is typically used by a physician, technician, nurse, clinician or other qualified user for programming operating parameters in IMD 14. External programmer 20 may be located in a clinic, hospital or other medical facility. External programmer 20 may alternatively be embodied as a home monitor or a handheld device that may be used in a medical facility, in the patient's home, or another location. Operating parameters, including sensing and therapy delivery control parameters, may be programmed into IMD 14 using external programmer 20.

External programmer 20 is configured for bidirectional communication with implantable telemetry circuitry included in IMD 14. External programmer 20 establishes a wireless communication link 24 with IMD 14. Communication link 24 may be established using a radio frequency (RF) link such as BLUETOOTH®, Wi-Fi, Medical Implant Communication Service (MICS) or other communication bandwidth. In some examples, external programmer 20 may include a programming head that is placed proximate IMD 14 to establish and maintain a communication link 24, and in other examples external programmer 20 and IMD 14 may be configured to communicate using a distance telemetry algorithm and circuitry that does not require the use of a programming head and does not require user intervention to maintain a communication link.

External programmer 20 may display data and information relating to pacemaker functions to a user for reviewing pacemaker operation and programmed parameters as well as EGM signals transmitted from IMD 14, mechanical motion signals acquired by IMD 14, or other physiological data that is acquired by and retrieved from IMD 14 during an interrogation session.

It is contemplated that external programmer 20 may be in wired or wireless connection to a communications network via a telemetry circuit that includes a transceiver and antenna or via a hardwired communication line for transferring data to a centralized database or computer to allow remote management of the patient. Remote patient management systems including a remote patient database may be configured to utilize the presently disclosed techniques to enable a clinician to review EGM, motion sensor, and marker channel data and authorize programming of sensing and therapy control parameters in IMD 14, e.g., after viewing a visual representation of EGM, motion sensor signal and marker channel data.

Additional information with respect to the use of mechanical motion data to detect atrial systolic events is set forth in U.S. Provisional Application No. 62/776,010 to Pronovici, entitled "MODE SWITCHING IN A VENTRICULAR PACEMAKER TO PROMOTE ATRIOVENTRICULAR CONDUCTION" and filed on Dec. 6, 2018; U.S. Provisional Application No. 62/776,027 to Splett, entitled "METHOD AND APPARATUS FOR ESTABLISHING PARAMETERS FOR ATRIAL EVENT DETECTION" and filed on Dec. 6, 2018; U.S. Provisional Application No. 62/776,034 to Splett, entitled "METHOD AND APPARATUS FOR ESTABLISHING PARAMETERS FOR ATRIAL EVENT DETECTION" and filed on Dec. 6, 2018; and U.S. application Ser. No. 16/387,894 to Sheldon, entitled "RATE SMOOTHING TO ENHANCE ATRIAL SYNCHRONOUS PACING IN A VENTRICULAR PACEMAKER" and filed on Apr. 18, 2019. The entire content of each of Application Nos. 62/776,010, 62/776,027, 62/776,034, and Ser. No. 16/387,894 are incorporated herein by reference.

In accordance with the techniques of the disclosure, external programmer may adjust event detection parameters used by IMD 14 for sensing mechanical motion data of heart 8 for use in cardiac pacing therapy. As described above, IMD 14 performs mechanical motion sensing of heart 8 via one or more motion sensors, such as one or more accelerometers. IMD 14 may use events detected from the mechanical motion data, and more particularly, detected A4 events, as an indicator for controlling timing of delivery of ventricular pacing pulse delivery to heart 8.

External programmer 20 receives an input from a user that specifies one or more event detection parameters. The one or more event detection parameters define the mechanical motion sensing of heart 8 performed by IMD 14. The one or more event detection parameters may specify, for example, a threshold amplitude of a window for sensing an A7 event, a threshold amplitude of a window for sensing an A4 event, a boundary separating the window for sensing an A7 event from the window for sensing an A4 event, an end of the window for sensing an A7 event, or a beginning of the window for sensing an A4 event, etc. External programmer 14 transmits the one or more event detection parameters to IMD 14 to control IMD 14 to perform mechanical motion sensing of heart 8 in accordance with the one or more event detection parameters.

In some examples, IMD 14 evaluates the mechanical motion data of heart 8 and delivers cardiac pacing therapy based on the evaluation of the mechanical motion data sensed in accordance with the one or more parameters. For example, IMD 14 may identify A4 events from the mechanical motion data of heart 8 and deliver ventricular pacing pulses subsequent to the identified A4 events. In this fashion, IMD 14 may maintain a target AV interval between a detected atrial systolic event and delivered ventricular pacing pulses so as to promote synchrony between atrial activation and ventricular activation.

In some examples, IMD 14 senses, via one or more electrodes, electrogram data of heart 8. IMD 14 transmits the electrogram data to external programmer 20. External programmer 20 may include a display for displaying, to a user, a representation of the electrocardiogram and electrogram data of heart 8 as well as a representation of the mechanical motion data of heart 8. In some examples, a user may use the representation of the electrocardiogram data of heart 8 as guidance to identify particular events, such as A3, A4, and A7 events, present within the representation of the mechanical motion data of heart 8.

External programmer 20 may further display, to the user, a representation of the one or more event detection parameters with respect to the representation of the mechanical motion data of heart 8. For example, external programmer 20 may display one or more lines, shaded regions, colored regions, shapes, arrows, markers, etc. to indicate the one or more event detection parameters as related to the mechanical motion data. For example, the representation of the one or more event detection parameters may include a box or region depicting a window for sensing an A7 event overlaid upon the mechanical motion data of heart 8 or a box or region depicting a window for sensing an A4 event overlaid upon the mechanical motion data of heart 8. Further, the representation of the one or more event detection parameters may include one or more lines depicting, e.g., a threshold amplitude of the window for sensing the A7 event (such as a minimum threshold), a threshold amplitude of the window for sensing the A4 event (such as a maximum threshold), a boundary separating the window for sensing the A7 event from the window for sensing the A4 event, an end of the window for sensing the A7 event, or a beginning of the window for sensing the A4 event. Additional illustration and description of the representation of the one or more event detection parameters is provided below with respect to FIG. 8.

To effectively deliver ventricular pacing pulses, IMD 14 maintains a target AV interval between A4 events and ventricular pacing pulses. To identify an A4 event, IMD 14 may use one or more detection windows, such as a detection window for sensing an A7 event and/or a detection window for sensing an A4 event. Such detection windows are defined by the one or more event detection parameters received from the user. By displaying the representation of the position of the detection windows with respect to the mechanical motion data, external programmer 20 may illustrate to the user how the event detection performed by IMD 14 in accordance with the specified one or more event detection parameters relates to the mechanical motion data of heart 8. The user may thus use such representations provided by external programmer 20 for guidance in adjusting the one or more event detection parameters defining the mechanical motion sensing of the heart of the patient.

For example, based on the representations of the mechanical motion data and the one or more detection windows, a user may conclude that IMD 14 is using a detection window for sensing the A4 event that does not align with the occurrence of the A4 event of heart 8. In response, external programmer 20 may receive, from the user, an adjustment to the A4 detection window such that IMD 14 more accurately detects the occurrence of the A4 event from the mechanical motion data. In some examples, external programmer 20 receives, from the user, an adjustment to one or more of a threshold amplitude of the window for sensing the A7 event (such as a minimum threshold), a threshold amplitude of the window for sensing the A4 event (such as a maximum threshold), a boundary separating the window for sensing the A7 event from the window for sensing the A4 event, an end of the window for sensing the A7 event, or a beginning of the window for sensing the A4 event. Additional illustration and description of the representation of the one or more event detection parameters is provided below with respect to FIG. 8.

Accordingly, the techniques set forth herein provide specific improvements to the computer-related field of programming medical devices that have practical applications. For example, the use of the techniques herein may enable external programmer 20 to generate visualizations of electrocardiogram data, electrogram data, and mechanical motion data of heart 8, as well as the event detection parameters that define the mechanical motion sensing performed by IMD 14. Such visualizations may enable an external programmer, such as external programmer 20, to inform a user as to how the external programmer applies event detection parameters to mechanical motion sensing performed by an IMD, such as IMD 14. Furthermore, an external programmer as described herein may provide an interface that simplifies the configuration of the mechanical sensing by the IMD, thereby reducing the likelihood of human error and increasing the accuracy of the IMD in identifying events within mechanical motion data, such as the A3, A4, and A7 events. Furthermore, the techniques of the disclosure may reduce the complexity of programming a medical device to identify events within mechanical motion data to the degree of accuracy required for such mechanical motion data to be used for controlling the delivery and timing of cardiac pacing delivery. Accordingly, the techniques of the disclosure may enable a medical device, such as IMD 14, to be programmed to identify events from mechanical motion data in a manner that is simplified, flexible, and patient-specific such that an IMD may use such mechanical motion data to control delivery and timing of cardiac pacing delivery.

Figure 2:
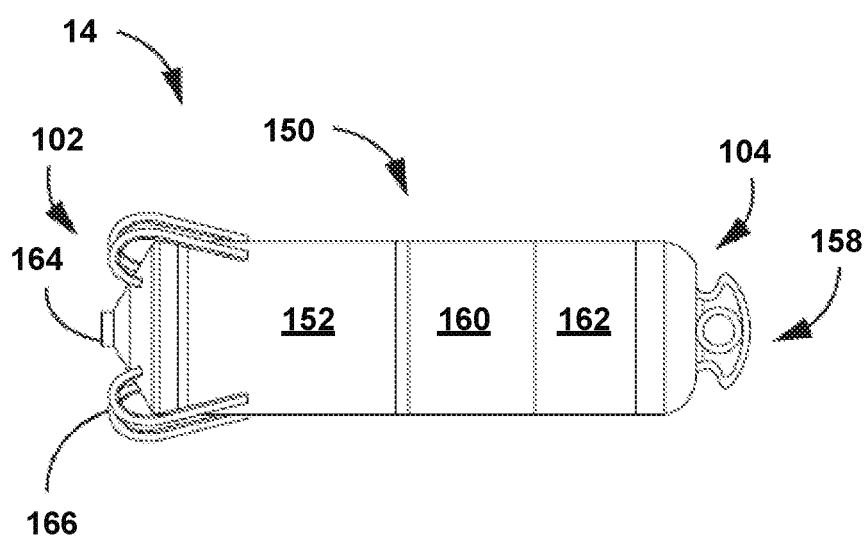
FIG. 2 is a conceptual diagram illustrating an example of the IMD of FIG. 1 in accordance with the techniques of the disclosure.

FIG. 2 is a conceptual diagram illustrating an example of IMD 14 of FIG. 1 in accordance with the techniques of the disclosure. IMD 14 includes electrodes 162 and 164 spaced apart along the housing 150 of IMD 14 for sensing electrogram data from heart 8 of FIG. 1 and delivering pacing pulses to heart 8. Electrode 164 is shown as a tip electrode extending from a distal end 102 of IMD 14, and electrode 162 is shown as a ring electrode along a mid-portion of housing 150, for example adjacent proximal end 104. Distal end 102 is referred to as "distal" in that it is expected to be the leading end as IMD 14 is advanced through a delivery tool, such as a catheter, and placed against a targeted pacing site.

Electrodes 162 and 164 form an anode and cathode pair for bipolar cardiac pacing and sensing. In alternative embodiments, IMD 14 may include two or more ring electrodes, two tip electrodes, and/or other types of electrodes exposed along pacemaker housing 150 for delivering electrical stimulation to heart 8 and sensing electrogram data. Electrodes 162 and 164 may be, without limitation, titanium, platinum, iridium or alloys thereof and may include a low polarizing coating, such as titanium nitride, iridium oxide, ruthenium oxide, platinum black among others. Electrodes 162 and 164 may be positioned at locations along IMD 14 other than the locations shown.

Housing 150 is formed from a biocompatible material, such as a stainless steel or titanium alloy. In some examples, the housing 150 may include an insulating coating. Examples of insulating coatings include parylene, urethane, PEEK, or polyimide among others. The entirety of the housing 150 may be insulated, but only electrodes 162 and 164 uninsulated. Electrode 164 may serve as a cathode electrode and be coupled to internal circuitry, e.g., a pacing pulse generation circuit and electrogram sensing circuitry, enclosed by housing 150 via an electrical feedthrough crossing housing 150. Electrode 162 may be formed as a conductive portion of housing 150 defining a ring electrode that is electrically isolated from the other portions of the housing 150 as generally shown in FIG. 2. In other examples, the entire periphery of the housing 150 may function as an electrode that is electrically isolated from tip electrode 164, instead of providing a localized ring electrode such as anode electrode 162. Electrode 162 formed along an electrically conductive portion of housing 150 serves as a return anode during pacing and sensing.

The housing 150 includes a control electronics subassembly 152, which houses the electronics for sensing cardiac signals, producing pacing pulses and controlling therapy delivery and other functions of IMD 14 as described in further detail below with respect to FIG. 3. IMD 14 may further include a motion sensor, which may be implemented, e.g., as an accelerometer enclosed within housing 150. The accelerometer provides a signal to a processor included in control electronics subassembly 152 for signal processing and analysis for detecting ventricular mechanical events and atrial systolic events for timing ventricular pacing pulses as described below.

Housing 150 further includes a battery subassembly 160, which provides power to the control electronics subassembly 152. Additional description of batteries implemented by battery subassembly 160 may be found in U.S. Pat. No. 8,433,409 to Johnson, et al., entitled "Implantable medical device battery," filed on Jan. 29, 2019, and issued on Apr. 30, 2013 and in U.S. Pat. No. 8,541,131 to Lund, et al., entitled "Elongate battery for implantable medical device," filed on Aug. 28, 2009, and issued on Sep. 24, 2013, the entire contents of each of which are incorporated herein by reference.

IMD 14 may include a set of fixation tines 166 to secure IMD 14 to patient tissue, e.g., by actively engaging with the ventricular endocardium and/or interacting with the ventricular trabeculae. Fixation tines 166 are configured to anchor IMD 14 to position electrode 164 in operative proximity to a targeted tissue for delivering therapeutic electrical stimulation pulses. Numerous types of active and/or passive fixation members may be employed for anchoring or stabilizing IMD 14 in an implant position. Additional detail with respect to fixation tines 166 may be found in U.S. Pat. No. 9,775,982 to Grubac, et al., entitled "Implantable medical device fixation," filed on Apr. 28, 2011 and issued on Oct. 3, 2017, the entire content of which is incorporated herein by reference.

IMD 14 may optionally include a delivery tool interface 158. Delivery tool interface 158 may be located at the proximal end 104 of IMD 14 and is configured to connect to a delivery device, such as a catheter, used to position IMD 14 at an implant location during an implantation procedure, for example within a heart chamber.

Figure 3:
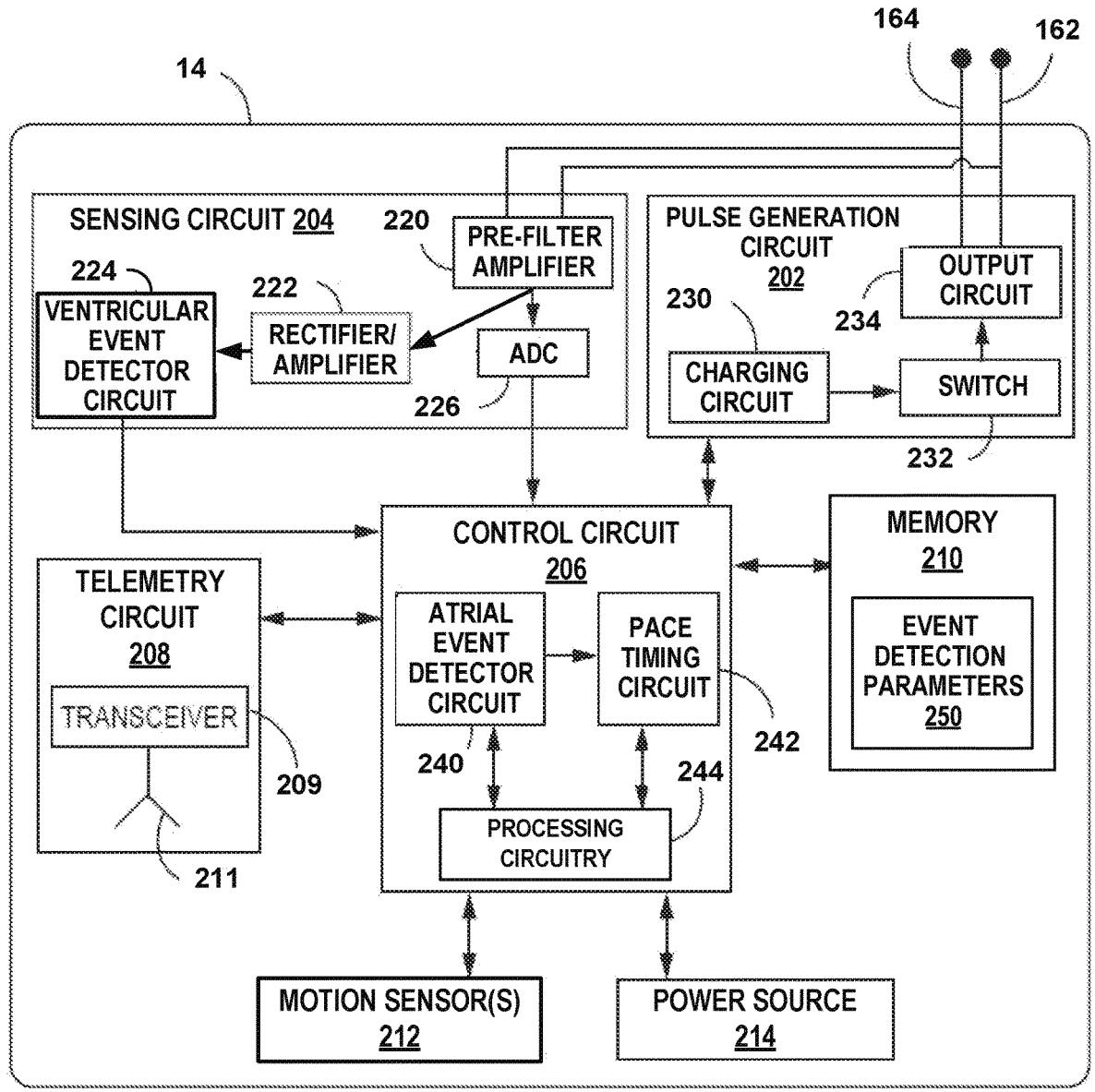
FIG. 3 is a block diagram illustrating an example configuration of the IMD of FIG. 1 in accordance with the techniques of the disclosure.

FIG. 3 is a block diagram of an example configuration of IMD 14 of FIG. 1 in accordance with the techniques of the disclosure. IMD 14 includes a pulse generation circuit 202, a sensing circuit 204, a control circuit 206, memory 210, telemetry circuit 208, motion sensor 212 and a power source 214.

Motion sensor 212 may be a multi-axis sensor, e.g., a two-dimensional or three-dimensional sensor, with each axis providing a signal that may be analyzed individually or in combination for detecting cardiac mechanical events. In the example of FIG. 2, motion sensor 212 is implemented as an accelerometer and may also be referred to herein as "accelerometer 212." However, in other examples, motion sensor 212 is another type of motion sensor or mechanical sensor capable of detecting mechanical motion of heart 8, such as a piezoelectric sensor or a MEMS device. Motion sensor 212 produces an electrical signal correlated to mechanical motion or vibration of sensor 212 (and IMD 14), e.g., when subjected to flowing blood and cardiac motion. The motion sensor 212 may include, e.g., filters, amplifiers, rectifiers, an ADC and/or other components for producing a mechanical motion signal passed to control circuit 206. For example, each vector signal corresponding to each individual axis of a multi-axis accelerometer may be filtered by a high pass filter, e.g., a 10 Hz high pass filter, and rectified for use by atrial event detector circuit 240 for detecting atrial systolic events. The high pass filter may be lowered (e.g., to 5 Hz) if needed to detect atrial signals that have lower frequency content. In some examples, high pass filtering is performed with no low pass filtering. In other examples, each accelerometer axis signal is filtered by a low pass filter, e.g., a 30 Hz low pass filter, with or without high pass filtering.

Motion sensor 212 may be a one-dimensional, single axis accelerometer, two-dimensional or three-dimensional multi-axis accelerometer. One example of an accelerometer for use in implantable medical devices is generally disclosed in U.S. Pat. No. 5,885,471 to Ruben, et al., entitled "Shock resistant accelerometer for implantable medical device," filed on Jul. 31, 1997 and issued on Mar. 23, 1999, the entire content of which is incorporated herein by reference. Additional detail with respect to an implantable medical device arrangement including a piezoelectric accelerometer for detecting patient motion is set forth in U.S. Pat. No. 4,485,813 to Anderson, et al., entitled "Implantable dynamic pressure transducer system," filed on Nov. 19, 1981, and issued on Dec. 4, 1984, and U.S. Pat. No. 5,052,388 to Sivula, et al., entitled "Method and apparatus for implementing activity sensing in a pulse generator," filed on Dec. 22, 1989, and issued on Oct. 1, 1991, the entire contents of each of which is incorporated by reference herein. Examples of three-dimensional accelerometers that may be implemented in IMD 14 and used for detecting cardiac mechanical events is set forth in in U.S. Pat. No. 5,593,431 to Sheldon, entitled "Medical service employing multiple DC accelerometers for patient activity and posture sensing and method," filed on Mar. 30, 1995 and issued on Jan. 14, 1997, and U.S. Pat. No. 6,044,297 to Sheldon, entitled "Posture and device orientation and calibration for implantable medical devices," filed on Sep. 25, 1998, and issued on Mar. 28, 2000, the entire contents of each of which are incorporated herein by reference. Other accelerometer designs may be used for producing an electrical signal that is correlated to motion imparted on IMD 14 due to ventricular and atrial events.

The various circuits represented in FIG. 3 may be combined on one or more integrated circuit boards which include a specific integrated circuit (ASIC), an electronic circuit, a processor (shared, dedicated, or group) and memory that execute one or more software or firmware programs, a combinational logic circuit, state machine or other suitable components that provide the described functionality.

Sensing circuit 204 is configured to sense electrogram data by sensing a cardiac electrical signal via electrodes 162 and 164 by a pre-filter and amplifier circuit 220. Pre-filter and amplifier circuit 220 may include a high pass filter to remove DC offset, e.g., a 2.5 to 5 Hz high pass filter, or a wideband filter having a passband of 2.5 Hz to 100 Hz to remove DC offset and high frequency noise. Pre-filter and amplifier circuit 220 may further include an amplifier to amplify the "raw" cardiac electrical signal passed to rectifier/amplifier 222 and analog-to-digital converter (ADC) 226. ADC 226 may pass a multi-bit, digital electrogram (EGM) signal to control circuit 206 for use, in some cases, by atrial event detector circuit 240 for detecting atrial electrical events, such as P-waves. For example, atrial event detector circuit 240 may use identification of atrial electrical events in algorithms for detecting atrial systolic events from the mechanical motion signal provided by motion sensors 212. The amplified signal of pre-filter and amplifier circuit 220 may also be passed to rectifier and amplifier circuit 222, which may include a rectifier, bandpass filter, and amplifier for passing a cardiac signal to ventricular event detector circuit 224 for use in identifying ventricular electrical events (e.g., R-waves or T-waves).

Ventricular event detector circuit 224 may include a sense amplifier or other detection circuitry that compares the incoming rectified, cardiac electrical signal to a ventricular event detection threshold, which may be an auto-adjusting threshold. In some examples, ventricular event detector circuit 224 is configured to detect ventricular events, such as an R-wave or a T-wave. When the incoming signal crosses the ventricular event detection threshold, ventricular event detector circuit 224 produces a sensed ventricular event signal (e.g., which may be an R-sense signal where an R-wave is detected) that is passed to control circuit 206. In other examples not expressly depicted in the example of FIG. 3, ventricular event detector circuit 224 may be configured to receive a digital output of ADC 226 for detecting ventricular events by a comparator, morphological signal analysis of the digital EGM signal, or to perform other ventricular event detection techniques. Sensed ventricular event signals passed from ventricular event detector circuit 224 to control circuit 206 may be used for scheduling ventricular pacing pulses by pace timing circuit 242 and for use in identifying the timing of ventricular electrical events in algorithms performed by atrial event detector circuit 240 for detecting atrial systolic events from a signal received from motion sensor 212.

Control circuit 206 includes an atrial event detector circuit 240, pace timing circuit 242, and processing circuitry 244. Atrial event detector circuit 240 is configured to detect atrial mechanical events from a signal received from motion sensor 212. In some examples, one or more ventricular mechanical events may be detected from the motion sensor signal in a given cardiac cycle to facilitate positive detection of the atrial systolic event from the motion sensor signal during the ventricular cycle.

Control circuit 206 may receive sensed ventricular event signals, such as sensed R-wave events, and/or digital electrogram data from sensing circuit 204 for use in detecting and confirming cardiac events and controlling ventricular pacing. For example, R-wave sensed event signals may be passed to pace timing circuit 242 for inhibiting scheduled ventricular pacing pulses or scheduling ventricular pacing pulses when IMD 14 is operating in a non-atrial tracking (asynchronous) ventricular pacing mode. R-wave sensed event signals may also be passed to atrial event detector circuit 240 for use in setting time windows used by control circuit 206 for detecting atrial systolic events from the motion sensor signal.

Atrial event detector circuit 240 receives a mechanical motion signal from motion sensor 212 and may start an atrial refractory period in response to a ventricular electrical event, e.g., an R-wave sensed event signal from sensing circuit 204 or delivery of a ventricular pacing pulse by pulse generation circuit 202. In some examples, atrial event detector circuit 240 determines if the motion sensor signal satisfies atrial mechanical event detection criteria outside of the refractory period. The motion sensor signal during the refractory period may be monitored by atrial event detector circuit 240 for the purposes of detecting ventricular mechanical events, which may be used for confirming or validating atrial systolic event detection. As such, ventricular mechanical event detection windows may be set during the atrial refractory period and may be set according to predetermined time intervals following identification of a ventricular electrical event.

As described herein, such event detection windows may be defined via one or more event detection parameters received from a user by external programmer 20 and transmitted to IMD 20 via telemetry circuit 208. Atrial event detector circuit 240 may be configured to detect one or more ventricular mechanical events during respective ventricular event detection windows, during the atrial refractory period. The timing and detection of the ventricular mechanical events may be used to update the atrial refractory period and/or an atrial systolic detection threshold amplitude and may be used to confirm detection of the atrial systolic event occurring subsequent to expected ventricular mechanical events.

Atrial event detector circuit 240 may set time windows corresponding to the passive ventricular filling phase and the active ventricular filling phase based on the timing of a preceding ventricular electrical event, either an R-wave sensed event signal or a ventricular pacing pulse. A motion sensor signal crossing of an atrial systolic event detection threshold during either of these windows may be detected as the atrial systolic event. As described below, two different atrial event detection thresholds may be established for applying during the respective passive filling phase window and active filling phase windows.

Atrial event detector circuit 240 passes an atrial event detection signal to processing circuitry 244 and/or pace timing circuit 242 in response to detecting an atrial systolic event from the motion sensor signal. In other examples, the atrial systolic event may be detected as a mechanical event from the motion sensor signal. Additional description with respect to atrial systolic event sensing or detection for use in controlling atrial synchronized ventricular pacing by an intracardiac ventricular pacemaker are set forth in U.S. Patent Application Pub. No. 2018/0161580 to Demmer, et al., entitled "INPUT SWITCHING IN A VENTRICULAR INTRACARDIAC PACEMAKER," filed on Dec. 13, 2016, and published on Jun. 14, 2018, the entire contents of which are incorporated by reference herein.

Pace timing circuit 242 (or processing circuitry 244) may additionally receive sensed ventricular event signals, such as sensed R-wave event signals, from ventricular event detector circuit 224 for use in controlling the timing of pacing pulses delivered by pulse generation circuit 202. In some examples, processing circuitry 244 is one or more microprocessors, digital signal processors (DSPs), application specific integrated circuits (ASICs), field programmable gate arrays (FPGAs), or any other equivalent integrated or discrete logic circuitry, as well as any combinations of such components. Processing circuitry 244 may include one or more clocks for generating clock signals that are used by pace timing circuit 242 to time out an AV pacing interval that is started upon receipt of an atrial event detection signal from atrial event detector circuit 240. Pace timing circuit 242 may include one or more pacing escape interval timers or counters that are used to time out the AV pacing interval, which may be a programmable interval stored in memory 210 and retrieved by processing circuitry 244 for use in setting the AV pacing interval used by pace timing circuit 242.

Pace timing circuit 242 may additionally include a lower pacing rate interval timer for controlling a lower ventricular pacing rate. For example, if an atrial systolic event is not detected from the motion sensor signal, thus not initiating the programmed AV pacing interval for triggering a ventricular pacing pulse, a ventricular pacing pulse may nevertheless be delivered by pulse generation circuit 202 upon expiration of the lower pacing rate interval to prevent ventricular asystole and maintain a minimum ventricular rate.

Processing circuitry 244 may retrieve other programmable pacing control parameters, such as pacing pulse amplitude and pacing pulse width, which are passed to pulse generation circuit 202 for controlling pacing pulse delivery from memory 210. In addition to providing control signals to pace timing circuit 242 and pulse generation circuit 202 for controlling pacing pulse delivery, processing circuitry 244 may provide sensing control signals to sensing circuit 204, e.g., ventricular event sensing thresholds such as an R-wave sensing threshold, sensitivity, and/or various blanking and refractory intervals applied to the electrogram data.

Pulse generation circuit 202 generates electrical pacing pulses that are delivered to the RV of the patient's heart via cathode electrode 164 and return anode electrode 162. Pulse generation circuit 202 may include charging circuit 230, switching circuit 232 and an output circuit 234. Charging circuit 230 may include a holding capacitor that may be charged to a pacing pulse amplitude by a multiple of the battery voltage signal of power source 214 under the control of a voltage regulator. The pacing pulse amplitude may be set based on a control signal from control circuit 206. Switching circuit 232 may control when the holding capacitor of charging circuit 230 is coupled to the output circuit 234 for delivering the pacing pulse. For example, switching circuit 232 may include a switch that is activated by a timing signal received from pace timing circuit 242 upon expiration of an AV pacing interval, a VV rate smoothing interval, or VV lower rate pacing interval) and kept closed for a programmed pacing pulse width to enable discharging of the holding capacitor of charging circuit 230. The holding capacitor, previously charged to the pacing pulse voltage amplitude, is discharged across electrodes 162 and 164 through the output capacitor of output circuit 234 for the programmed pacing pulse duration. Additional description of pacing circuitry is set forth in U.S. Pat. No. 5,507,782 to Kieval, et al., entitled "Method and apparatus for dual chamber cardiac pacing," filed on Mar. 17, 1994 and issued on Apr. 16, 1996 and U.S. Pat. No. 8,532,785 to Crutchfield, et al., entitled "Therapy delivery method and system for implantable medical devices," filed on Sep. 26, 2012, and issued on Sep. 10, 2013, the entire contents of each of which are incorporated herein by reference. Such pacing circuitry described by U.S. Pat. Nos. 5,507,782 and 8,532,785 may be implemented in IMD 14 for charging a pacing capacitor to a predetermined pacing pulse amplitude under the control of control circuit 206 and delivering a pacing pulse.

Memory 210 may include computer-readable instructions that, when executed by control circuit 206, cause control circuit 206 to perform various functions attributed throughout this disclosure to IMD 14. The computer-readable instructions may be encoded within memory 210. Memory 210 may include any non-transitory, computer-readable storage media including any volatile, non-volatile, magnetic, optical, or electrical media, such as a random access memory (RAM), read-only memory (ROM), non-volatile RAM (NVRAM), electrically-erasable programmable ROM (EEPROM), flash memory, or other digital media.

Memory 210 may store event detection parameters 250, such as timing intervals and other data used by control circuit 206 to control the delivery of pacing pulses by pulse generation circuit 202, e.g., by detecting an atrial systolic event by atrial event detector circuit 240 from the motion sensor signal and controlling the timing of delivery of ventricular pacing pulse delivery by pulse generation circuit 202. Such event detection parameters 250 may include, e.g., a beginning or an ending of a detection window for sensing an A7 event, a beginning or an ending of a detection window for sensing an A4 event, a threshold amplitude for the detection window for sensing the A7 event (e.g., such as a minimum threshold or a maximum threshold), a threshold amplitude for the detection window for sensing the A4 event (e.g., such as a minimum threshold or a maximum threshold), or a boundary separating the window for sensing the A7 event from the window for sensing the A4 event, etc.

Power source 214 provides power to each of the other circuits and components of IMD 14 as required. Power source 214 may include one or more energy storage devices, such as one or more rechargeable or non-rechargeable batteries. The connections between power source 214 and other pacemaker circuits and components are not shown in FIG. 3 for the sake of clarity but are to be understood from the general block diagram of FIG. 3. For example power source 214 may provide power to charging circuit 230 for charging a holding capacitor to a pacing voltage amplitude, current to switch 232 and other circuitry included in pulse generation circuit 202 as needed, power to transceiver 209, motion sensor 212, and ADC 226 and other circuitry of sensing circuit 204 as needed as well as memory 210.

Telemetry circuit 208 includes a transceiver 209 and antenna 211 for transferring and receiving data via a radio frequency (RF) communication link. Telemetry circuit 208 may be capable of bi-directional communication with external programmer 20 (FIG. 1) as described above. Mechanical motion data and electrogram data may be transmitted by telemetry circuit 208 to external programmer 20. Furthermore, event detection parameters, pacing control parameters, and algorithms for performing atrial event detection and/or ventricular pacing control may be received by telemetry circuit 208 and stored in memory 210 for access by control circuit 206.

In accordance with the techniques of the disclosure, control circuit 206 may receive, from external programmer 20 of FIG. 1, one or more event detection parameters used by atrial event detector circuit 240 for identifying cardiac events from sensed mechanical motion data of heart 8. Based on the one or more event detection parameters, atrial event detector circuit 240 defines a detection window for identifying cardiac events from mechanical motion data sensed via one or more motion sensors 212. Pace timing circuit 242 may use the cardiac events detected from the mechanical motion data, and more particularly, detected A4 events, to control timing of delivery of ventricular pacing pulse delivery by pulse generation circuit 202 to heart 8.

In some examples, external programmer 20 of FIG. 1 receives an input from a user that specifies the one or more event detection parameters. Control circuit 206 receives, via telemetry circuit 208, the one or more event detection parameters. The one or more event detection parameters may specify, for example, a threshold amplitude of a window for sensing an A7 event, a threshold amplitude of a window for sensing an A4 event, a boundary separating the window for sensing an A7 event from the window for sensing an A4 event, an end of the window for sensing an A7 event, or a beginning of the window for sensing an A4 event, etc.

In some examples, control circuit 206 transmits, via telemetry circuit 208, mechanical motion data of heart 8 sensed in accordance with the one or more event detection parameters to, e.g., external programmer 20. Control circuit 206 may further transmit, via telemetry circuit 208, electrogram data sensed via sensing circuitry 204. As described in more detail below, external programmer 20 may present the mechanical motion data, electrocardiogram data, and electrogram data for display to a user. The user may use the mechanical motion data and electrocardiogram data for guidance in adjusting the one or more event detection parameters defining the mechanical motion sensing of heart 8 of the patient so as to configure atrial event detector 240 to more accurately detect atrial events via motion sensors 212. Control circuit 206 may receive, via telemetry circuit 208 and from external programmer 20, the adjustments to the one or more event detection parameters to adjust the sensing of mechanical motion data of heart 8 by motion sensors 212 and/or atrial event detection by atrial event detector 240.

In some examples, control circuit 206 evaluates the mechanical motion data of heart 8 (e.g., without uploading such data to external programmer 20) and controls pulse generation circuit 202 to deliver cardiac pacing therapy based on the evaluation of the mechanical motion data sensed in accordance with the one or more parameters. For example, based on A4 events detected by atrial event detector circuit 240 in accordance with the one or more event detection parameters, pace timing circuit 242 may control pulse generation circuit 202 to deliver ventricular pacing pulses that are subsequent to the detected A4 events by a target AV interval. In some examples, the target AV interval is a period of time that is programmable by a clinician. The target AV interval may specify a period of time between atrial activation and ventricular activation that results in optimal cardiac efficiency of heart 8. In this fashion, IMD 14 may provide cardiac pacing therapy to the patient in a manner that promotes synchrony between atrial activation and ventricular activation.

Figure 4:
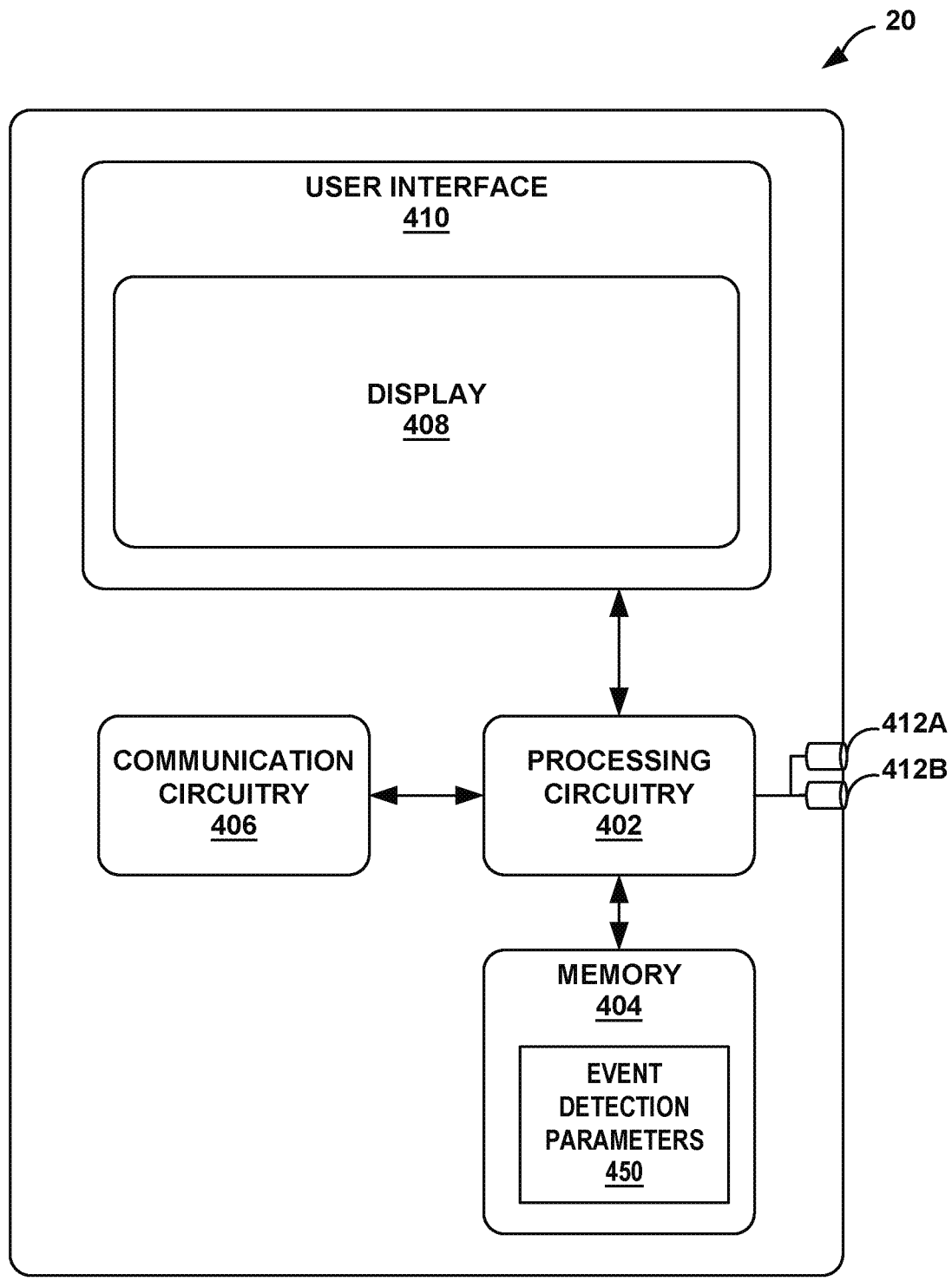
FIG. 4 is a block diagram illustrating an example configuration of the external programmer of FIG. 1 in accordance with the techniques of the disclosure.

FIG. 4 is a block diagram illustrating an example configuration of external programmer 20 of FIG. 1 in accordance with the techniques of the disclosure. External programmer 20 is used to interface with an implanted medical device, such as IMD 14 of FIG. 1, using a communication scheme, usually called telemetry. In some examples external programmer 20 is configured to program IMD 14, e.g., to sense electrogram data and/or perform mechanical motion sensing of heart 8 of FIG. 1. In other examples, external programmer 20 is configured to interrogate IMD 14 to obtain information or telemetric data from the IMD 14, which may include the sensed electrogram data and/or mechanical motion data. External programmer 20 is used for any number of tasks associated with IMD 14, including, but not limited to, obtaining information about the condition, state, or status of IMD 14, obtaining information about patient 12, including information related to the treatment intended to be provided by IMD 14, sending information directed or, at least in part, specifying sensing parameters, such as event detection parameters for defining mechanical motion sensing, treatment parameters, such as cardiac pacing parameters defining cardiac pacing therapy, and conditions being or to be provided by IMD 14, or sending or updating maintenance information concerning IMD 14. In short, external programmer 20 facilitates communication between a user, such as a clinician or a patient, and IMD 14 after implantation of IMD 14 within heart 8 of the patient.

External programmer 20 includes communication circuitry 406 containing components necessary for communicating telemetry data with IMD 14. External programmer 20 further includes a user interface 410. A clinician may use user interface 410 to send and receive commands to IMD 14 via external programmer 20. As described herein, a clinician uses user interface 410 to specify one or more event detection parameters for defining mechanical motion sensing performed by IMD 14. Typically, user interface 410 includes one or more input devices and one or more output devices, such as display 408. The input devices of user interface 410 may include a communication device such as a network interface, keyboard, pointing device, voice responsive system, video camera, biometric detection/response system, button, sensor, mobile device, control pad, microphone, presence-sensitive screen, touch-sensitive screen, network, or any other type of device for detecting input from a human or machine.

The one or more output devices of user interface 410 may include a communication unit such as a network interface, display, sound card, video graphics adapter card, speaker, presence-sensitive screen, one or more USB interfaces, video and/or audio output interfaces, or any other type of device capable of generating tactile, audio, video, or other output. As depicted in FIG. 4, user interface 410 includes display 408, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In other examples, user interface 410 may produce an output to a user in another fashion, such as via a sound card, video graphics adapter card, speaker, presence-sensitive screen, touch-sensitive screen, one or more USB interfaces, video and/or audio output interfaces, or any other type of device capable of generating tactile, audio, video, or other output. In some examples, display 408 is a presence-sensitive display that may serve as a user interface device that operates both as one or more input devices and one or more output devices.

External programmer 20 further includes memory 404 for storing programming instructions for generating and processing user interface 410, processing information received from IMD 14, and generating commands or information to be sent to IMF 14. Furthermore, memory 404 may store event detection parameters 450, such as timing intervals and other data used to define delivery of pacing pulses by IMD 14, e.g., by defining one or more detection windows for detecting an atrial systolic event from mechanical motion data sensed by IMD 14 and/or for controlling the timing and delivery of ventricular pacing pulse delivery by IMD 14. Such event detection parameters 450 may include, e.g., a beginning or an ending of a detection window for sensing an A7 event, a beginning or an ending of a detection window for sensing an A4 event, a threshold amplitude for the detection window for sensing the A7 event (e.g., such as a minimum threshold or a maximum threshold), a threshold amplitude for the detection window for sensing the A4 event (e.g., such as a minimum threshold or a maximum threshold), or a boundary separating the window for sensing the A7 event from the window for sensing the A4 event, etc.

Memory 404 may include any volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital or analog media.

Processing circuitry 402 executes the programming instructions stored in memory 404. Processing circuitry 402 may include any one or more of a microprocessor, a controller, a digital signal processor (DSP), an application specific integrated circuit (ASIC), a field-programmable gate array (FPGA), or equivalent discrete or analog logic circuitry. In some examples, processing circuitry 402 may include multiple components, such as any combination of one or more microprocessors, one or more controllers, one or more DSPs, one or more ASICs, or one or more FPGAs, as well as other discrete or integrated logic circuitry. The functions attributed to processing circuitry 402 herein may be embodied as software, firmware, hardware or any combination thereof.

Communication circuitry 406 includes any suitable circuitry, firmware, software, or any combination thereof for communicating with another device, such as IMD 14 of FIG. 1. For example, communication circuitry 406 may include one or more antennae, modulation and demodulation circuitry, filters, amplifiers, or the like for radio frequency communication with IMD 14. Under the control of processing circuitry 402, communication circuitry 406 may receive downlink telemetry from and send uplink telemetry to other devices with the aid of an antenna, which may be internal and/or external. Processing circuitry 402 may provide the data to be uplinked to other devices and the control signals for the telemetry circuit within communication circuitry 406, e.g., via an address/data bus. In some examples, communication circuitry 406 may provide received data to processing circuitry 402 via a multiplexer.

In some examples, external programmer 20 includes external ports 412A-412B (collectively, "external ports 412" or "ports 412"). Each of ports 412 may adapt to an interface of one or more external leads that comprise one or more electrodes. In some examples, external programmer 20 may obtain, via the one or more electrodes of the one or more external leads, electrocardiogram data from the patient or from another electrocardiogram input source.

In accordance with the techniques of the disclosure, processing circuitry 402 adjusts event detection parameters used by IMD 14 for sensing mechanical motion data of heart 8 for use in controlling the timing and delivery of cardiac pacing therapy. As described above, IMD 14 performs mechanical motion sensing of heart 8 via one or more motion sensors, such as one or more accelerometers, and senses electrogram data of heart 8. Processing circuitry 402 receives, via communication circuitry 406, the electrogram data and mechanical motion data of heart 8 sensed by IMD 14. In some examples, processing circuitry 402 displays, via display 408, a representation of the electrogram data of heart 8 obtained from IMD 14, a representation of the electrocardiogram data of heart 8 obtained via ports 412, a representation of the mechanical motion data of heart 8 obtained from IMD 14, or any combination of the foregoing. For example, processing circuitry 402 may collect the electrogram data of heart 8 obtained from IMD 14, the electrocardiogram data of heart 8 obtained via ports 412, the mechanical motion data of heart 8 obtained from IMD 14 and integrate each of the data streams into a single user interface for display to the user. Processing circuitry 402 further may display, via display 408, a representation of the one or more event detection parameters with respect to the representation of the mechanical motion data of heart 8.

The user may use such representations for guidance in specifying the one or more event detection parameters defining the mechanical motion sensing of the heart of the patient so as to configure IMD 14 to more accurately detect such mechanical cardiac events. For example, processing circuitry 402 receives, via user interface 410, an input from a user that specifies one or more event detection parameters. The one or more event detection parameters define the mechanical motion sensing of heart 8 performed by IMD 14. The one or more event detection parameters may specify, for example, a threshold amplitude of a window for sensing an A7 event, a threshold amplitude of a window for sensing an A4 event, a boundary separating the window for sensing an A7 event from the window for sensing an A4 event, an end of the window for sensing an A7 event, or a beginning of the window for sensing an A4 event, etc. Processing circuitry 402 transmits, via communication circuitry 406, the one or more event detection parameters to IMD 14 to control IMD 14 to perform mechanical motion sensing of heart 8 in accordance with the one or more event detection parameters.

For example, processing circuitry 402 causes display 408 to display one or more lines, shaded regions, colored regions, shapes, arrows, markers, etc. overlaid upon the representation of the mechanical motion data of heart 8 to indicate the one or more event detection parameters as related to the mechanical motion data. For example, the representation of the one or more event detection parameters may include a box or region depicting a window for sensing an A7 event overlaid upon the mechanical motion data of heart 8 or a box or region depicting a window for sensing an A4 event overlaid upon the mechanical motion data of heart 8. Further, the representation of the one or more event detection parameters may include one or more lines depicting, e.g., a threshold amplitude of the window for sensing the A7 event (such as a minimum threshold), a threshold amplitude of the window for sensing the A4 event (such as a maximum threshold), a boundary separating the window for sensing the A7 event from the window for sensing the A4 event, an end of the window for sensing the A7 event, or a beginning of the window for sensing the A4 event. Additional illustration and description of the representation of the one or more event detection parameters is provided below with respect to FIG. 8.

Figure 5:
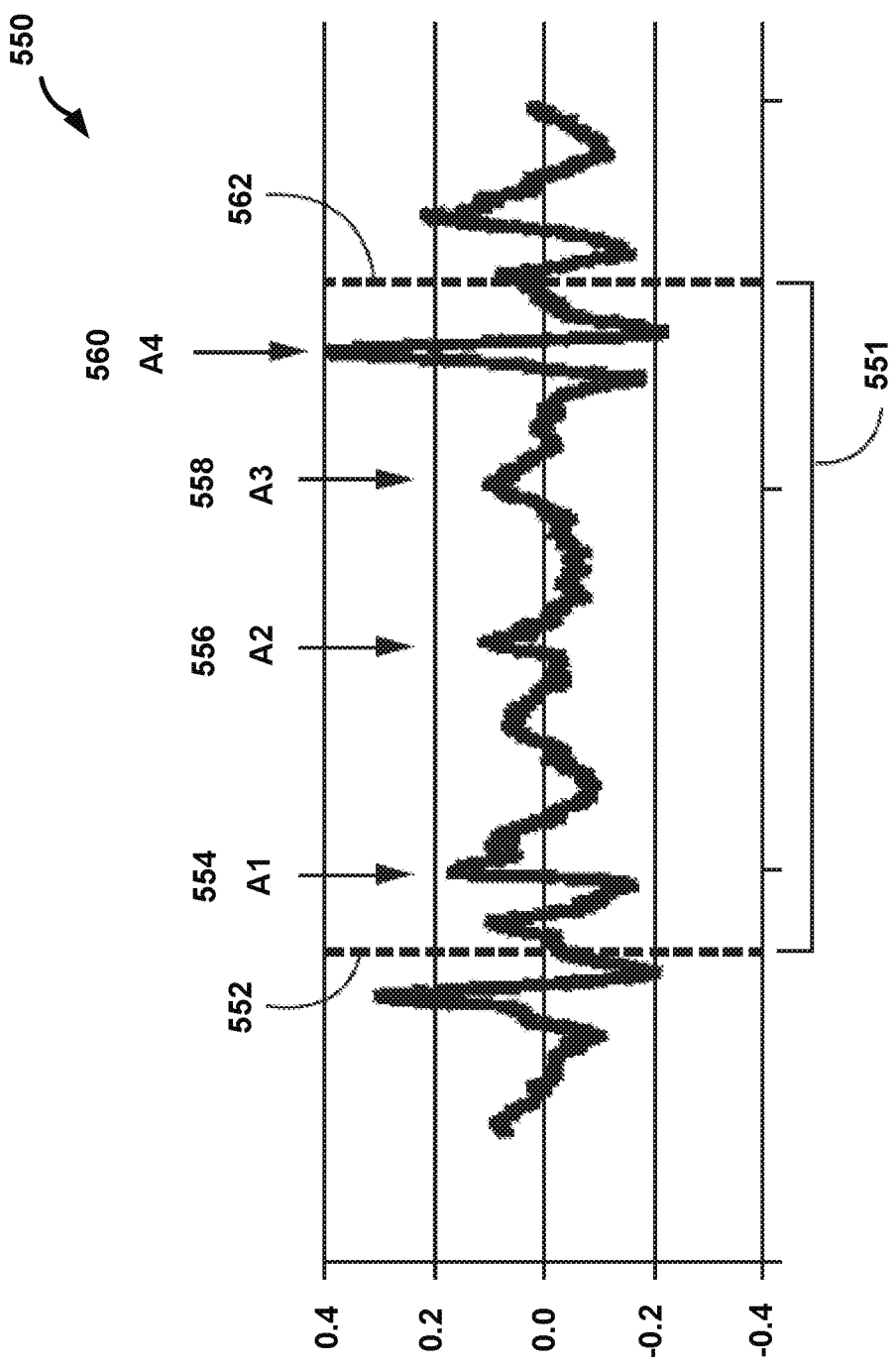
FIG. 5 is an example of a motion sensor signal that may be acquired by a motion sensor of the IMD of FIGS. 1 and 2 over a cardiac cycle in accordance with the techniques of the disclosure.

FIG. 5 is an example of a motion sensor signal 550 that may be acquired by motion sensor 212 of IMD 14 of FIGS. 1 and 2 over a cardiac cycle in accordance with the techniques of the disclosure. Vertical dashed lines 552 and 562 denote the timing of two consecutive ventricular events (an intrinsic ventricular depolarization or a ventricular pace), marking the respective beginning and end of the ventricular cycle 551. The mechanical motion signal includes an A1 event 554, an A2 event 556, an A3 event 558 and an A4 event 560. The A1 event 554 is an acceleration signal (in this example when motion sensor 212 is implemented as an accelerometer) that occurs during ventricular contraction and marks the approximate onset of ventricular mechanical systole. The A1 event is also referred to herein as a "ventricular contraction event." The A2 event 265 is an acceleration signal that occurs during ventricular relaxation and marks the approximate offset or end of ventricular mechanical systole. The A2 event is also referred to herein as the "ventricular relaxation event." The A3 event 558 is an acceleration signal that occurs during passive ventricular filling and marks ventricular mechanical diastole. The A3 event is also referred to herein as the "ventricular passive filling event." Since the A2 event occurs with the end of ventricular systole, it is an indicator of the onset of ventricular diastole. The A3 event occurs during ventricular diastole. As such, the A2 and A3 events may be collectively referred to as ventricular mechanical diastolic events because they are both indicators of the ventricular diastolic period.

The A4 event 560 is an acceleration signal that occurs during atrial contraction and active ventricular filling and marks atrial mechanical systole. The A4 event 560 may also referred to herein as the "atrial systolic event" or merely the "atrial event," and is the atrial systolic event that is detected from motion sensor signal 550 by atrial event detector circuit 240 for controlling pace timing circuit 242 to trigger ventricular pacing pulse delivery by starting an AV pacing interval in response to detecting the A4 event 560. As described below, control circuit 206 may be configured to detect one or more of the A1, A2, and A3 events from motion sensor signal 550, for at least some ventricular cardiac cycles, for use in positively detecting the A4 event 560 and setting atrial event detection control parameters. The A1, A2 and/or A3 events may be detected and characterized to avoid false detection of A4 events and promote reliable A4 event detection for proper timing of atrial-synchronized ventricular pacing pulses.

Figure 6:
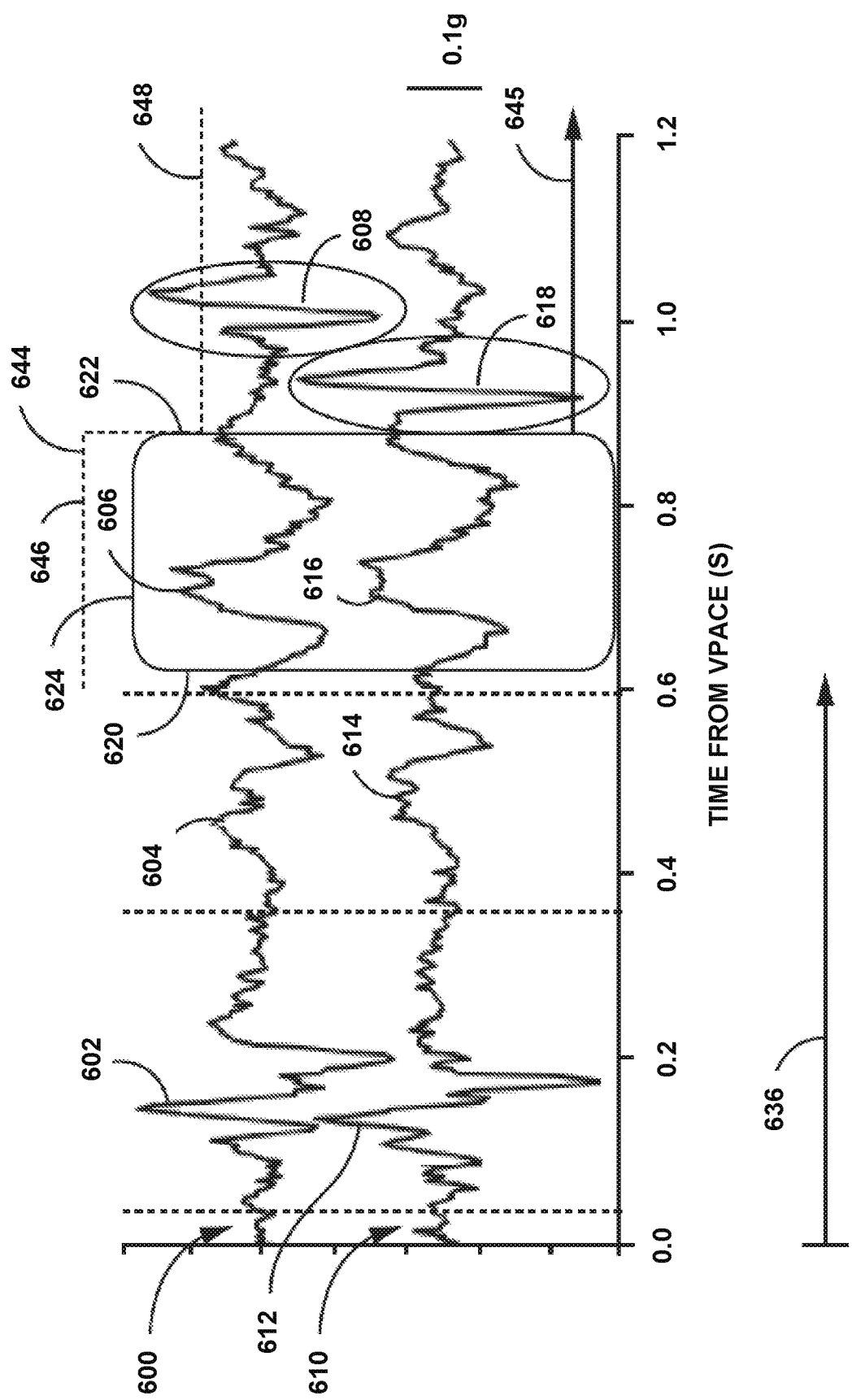
FIG. 6 is an example of mechanical motion signals acquired over two different cardiac cycles in accordance with the techniques of the disclosure.

FIG. 6 is an example of mechanical motion signals 600 and 610 acquired over two different cardiac cycles in accordance with the techniques of the disclosure. For convenience, FIG. 6 is described with respect to IMD 14 of FIG. 3. In some examples, mechanical motion signals 600 and 610 are sensed via motion sensors 212. A ventricular pacing pulse is delivered at time 0.0 seconds for both cardiac cycles. In some examples, pulse generation circuit 202 delivers the ventricular pacing pulse. First mechanical motion signal 600 is received over one cardiac cycle and second mechanical motion signal 610 is received over a different cardiac cycle. The two mechanical motion signals 600 and 610 are aligned in time at 0.0 seconds, the time of the ventricular pacing pulse delivery. While mechanical motion signals 600 and 610 and mechanical motion signal 550 of FIG. 5 are shown as raw accelerometer signals, it is recognized that control circuit 206 may receive a filtered, amplified and rectified signal from motion sensor 212 for processing and analysis as described herein.

As depicted in the example of FIG. 6, A1 events 602 and 612 of respective mechanical motion signals 600 and 610, which occur during ventricular contraction, are observed to be well-aligned in time following the ventricular pacing pulse at time 0.0 seconds. Similarly, the A2 events 604 and 614 (occurring during ventricular relaxation) and the A3 events 606 and 616 (occurring during passive ventricular filling) are well-aligned in time. Because the A1, A2 and A3 events are ventricular events occurring during ventricular contraction, ventricular relaxation, and passive ventricular filling, respectively, these events are expected to occur at relatively consistent intervals following a ventricular electrical event, e.g., the ventricular pacing pulse in the example of FIG. 6, as well as relatively consistent intervals relative to one another. The time relationship of the A1, A2 and A3 events may be different following a ventricular pacing pulse compared to, e.g., following a sensed intrinsic R-wave. However, during a stable paced or intrinsic ventricular rhythm, the relative timing of A1, A2 and A3 events to each other and the immediately preceding ventricular electrical event is expected to be consistent.

A4 events 608 and 618 of first and second mechanical motion sensor signals 600 and 610, respectively, are not aligned in time. An A4 event occurs during atrial systole, and as such, the time interval between an A4 event following an immediately preceding ventricular electrical event (e.g., a sensed R-wave or a ventricular pacing pulse) and the preceding A1 through A3 events may vary between cardiac cycles.

The consistency of the timing of the A1 through A3 events relative to each other and the immediately preceding ventricular electrical event may be used for determining an atrial refractory period 636 and increasing confidence in reliably detecting A4 events 608 and 618. The atrial systolic event is not detected during the atrial refractory period 636, which extends from the ventricular electrical event (at time 0.0) to an estimated onset of ventricular systole. An A3 sensing window 624 may be set having a beginning time 620 corresponding to the end of the post-ventricular atrial refractory period 636 and an ending time 622. The ending time 622 may also be considered a beginning time of an A4 sensing window 645. In some examples, ending time 622 is a boundary separating A3 sensing window 624 from A4 sensing window 645, although A4 signals may be sensed during the A3 window in some instances.

A4 events 608 and 618 may be detected based on a multi-level A4 detection threshold 644. As seen by second motion sensor signal 610, A4 event 618 may occur earlier after A3 window 624 due to changes in atrial rate.

In some instances, as the atrial rate increases, A4 event 618 may occur within A3 window 624. When this occurs, A3 event 616 and A4 event 618 may fuse as passive and active ventricular filling occur together (not depicted in FIG. 6). The fused A3/A4 event is referred to herein as an "A7 event." An A7 event may have a high amplitude, even greater than the amplitude of either A3 event 616 or A4 event 618 when they occur separately. As such, in some examples an A7 threshold amplitude 646 may be established for detecting an A7 event that occurs during A3 window 624. For example, an event which has an amplitude less than A7 threshold amplitude 646 may be interpreted as an A3 event, while an event which has an amplitude greater than A7 threshold amplitude 646 may be interpreted as an A7 event. A3 sensing window 624 may therefore be used to detect both A3 events and A7 events, and may also be referred to as an A7 sensing window through this disclosure.

An A4 threshold amplitude 648 may be established for detecting A4 events that are not fused with A3 events, e.g., that occur after ending time 622 of A3 window 624 and during A4 window 645. A4 window 645 extends from the ending time of the A3 window 624 until the next ventricular electrical event, sensed or paced. The earliest crossing of A4 detection threshold 644 by one of mechanical motion signals 600, 610 after starting time 620 of A3 window 624 (or after the expiration of the atrial refractory period 636) may be detected as the atrial systolic event.

Various examples of an intracardiac pacemaker configured to detect atrial systolic events from a motion sensor signal for delivering atrial synchronized ventricular pacing are set forth in U.S. Patent Application Pub. No. 2018/0085589 to Splett et al., entitled "ATRIAL TRACKING IN AN INTRACARDIAC VENTRICULAR PACEMAKER," filed on Sep. 29, 2016, and published on Mar. 29, 2018; U.S. Patent Application Pub. No. 2018/0085588 to Splett, et al., entitled "ATRIAL TRACKING IN AN INTRACARDIAC VENTRICULAR PACEMAKER," filed on Sep. 29, 2016, and published on Mar. 29, 2018; U.S. Patent Application Pub. No. 2018/0117337 to Demmer, et al., entitled "ATRIAL TRACKING IN AN INTRACARDIAC VENTRICULAR PACEMAKER," filed on Nov. 3, 2016, and published on May 3, 2018; U.S. Patent Application Pub. No. 2018/0161580, referenced above, and U.S. Pat. No. 10,207, 116 to Sheldon, et al., entitled "Pacing mode switching in a ventricular pacemaker," filed on Dec. 1, 2016, and issued on Feb. 19, 2019, the entire contents of each of which is incorporated herein by reference.

Figure 7:
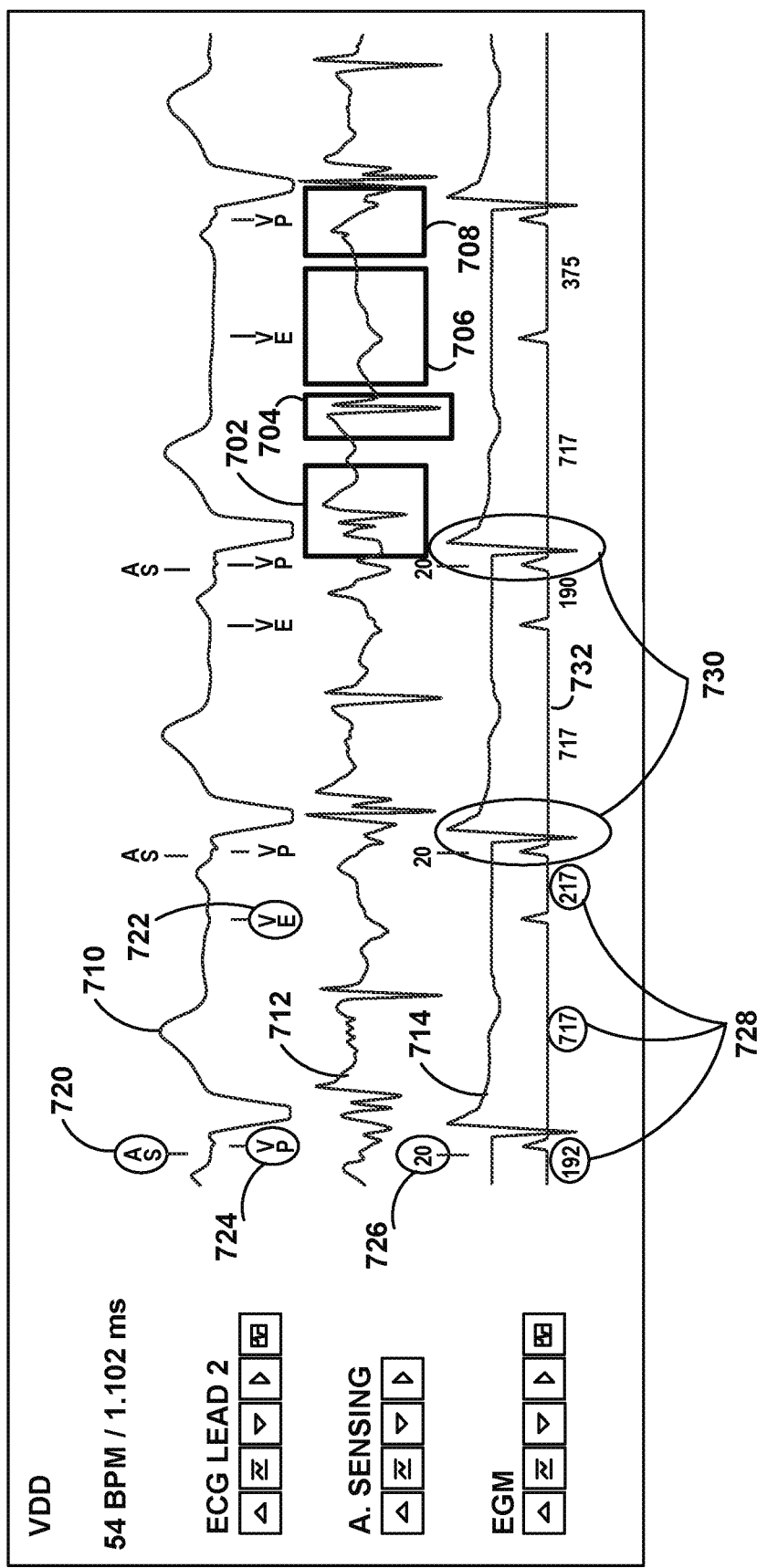
FIG. 7 is an example of electrocardiogram, electrogram and mechanical motion signals acquired from a patient in accordance with the techniques of the disclosure.

FIG. 7 is an example of electrocardiogram, electrogram, and mechanical motion signals acquired from a patient in accordance with the techniques of the disclosure. For convenience, FIG. 7 is described with respect to IMD 14 of FIG. 3. For example, FIG. 7 depicts electrogram signal 714 sensed via sensing circuit 204, mechanical motion signal 712 sensed via motion sensors 212, and electrocardiogram signal 710 sensed via one or more electrodes disposed on one or more leads. Each of electrocardiogram signal 710, mechanical motion signal 712, and electrogram signal 714 are sensed concurrently to illustrate the timing of particular features of electrocardiographic mechanical motion of heart 8 with respect to one another.

Electrocardiogram signal 710 depicts an electrocardiogram signal sensed via one or more electrodes disposed on one or more leads. In some examples, the one or more leads are external to the patient. In some examples, the one or more leads are one or more subcutaneous leads. As depicted in the example of FIG. 7, Electrocardiogram signal 710 depicts QRS complexes 730 of heart 8 of the patient over several cardiac cycles.

In the example of FIG. 7, IMD 14 is positioned within a right ventricle of heart 8 of FIG. 1. Electrogram signal 714 depicts electrical activity of the right ventricle of heart 8 sensed by IMD 14. In some examples, IMD 14 senses electrogram signal 714 via one or more of electrodes 162 and 164 and housing 150 of IMD 14.

The example of FIG. 7 further illustrates detected events 720, 722, and 724 overlaid upon electrocardiogram signal 710. Events 720 are occurrences of atrial sensed events denoted in FIG. 7 as "AS." Events 720 may also be denoted as atrial mechanical events (AM) to differentiate from electrical atrial events (AS). Events 722 are occurrences of an end of an A3/A7 sensing window (e.g., "ventricular end") denoted in FIG. 7 as "VE." Events 724 are occurrences of delivered ventricular pacing by IMD 14 denoted in FIG. 7 as "VP." Furthermore, the example of FIG. 7 includes marker channel data 732 that includes timing intervals 726 and 728. Timing intervals 726 correspond to a target atrioventricular (AV) interval. Timing intervals 726 occur when there is a ventricular sensed or paced event (e.g., VS or VP), provides an elapsed time from a previous atrial event. Timing intervals 728 correspond to intervals between consecutive detected events. Specifically, timing interval 728 labeled "192" refers to a time elapsed (e.g., 192 milliseconds) between a previous VE event (not depicted in FIG. 7) to ventricular pacing event 724. Timing interval 728 labeled "717" refers to a time elapsed (e.g., 717 milliseconds) between VP event 724 and VE event 722. Timing interval 728 labeled "217" refers to a time elapsed (e.g., 217 milliseconds) between VE event 722 and a subsequent VP event 724. The positions of detected events 720, 722, and 724 overlaid upon electrocardiogram signal 710 are illustrated in FIG. 7 as examples only, and may be located at other positions of the user interface in accordance with the techniques set forth herein.

Mechanical motion signal 712 depicts mechanical motion data sensed by IMD 14 from within the right ventricle of heart 8. As illustrations, mechanical motion signal 712 depicts A1 event 702, A2 event 704, A3 event 706, and A4 event 708. As illustrated in the example of FIG. 7, A1 event 702 immediately follows an instance of QRS complex 730. A2 event 704 is typically a sharp signal. A2 event 704 is usually near the end of a T-wave. A3 event 706 occurs after A2 event 704. A3 event 706 is a usually a rounder signal. A4 event 708 occurs shortly after a P-wave. As described above, in some examples, IMD 14 may use a detected A4 event as an indicator for controlling the timing of delivery of ventricular pacing pulse delivery.

An A7 event occurs when A3 event 706 and A4 event 708 occur at the same time. This causes summation of A3 event 706 and A4 event 708 which may result in a larger waveform referred to herein as an "A7 event." Fusion of A3 event 706 and A4 event 708 happens when passive and active filling of the ventricles of heart 8 occur simultaneously. This may occur at higher heart rates, or because of a lack of AV synchrony.

An occurrence of an A7 event is similar to a heart sounds summation gallop (e.g., a summation of heart sounds S3 and S4). A threshold amplitude of a window for sensing an A7 event is programmed to have a value higher than an amplitude of A3 event 706. Thus, when A3 event 706 and A4 event 708 are not fused, the threshold amplitude of the window for sensing the A7 event that is higher than the amplitude of A3 event 706 may prevent the sensing of A3 event 706, which signifies passive filling of heart 8, as the atrial contraction (e.g., represented as A4 event 708).

Figure 8:
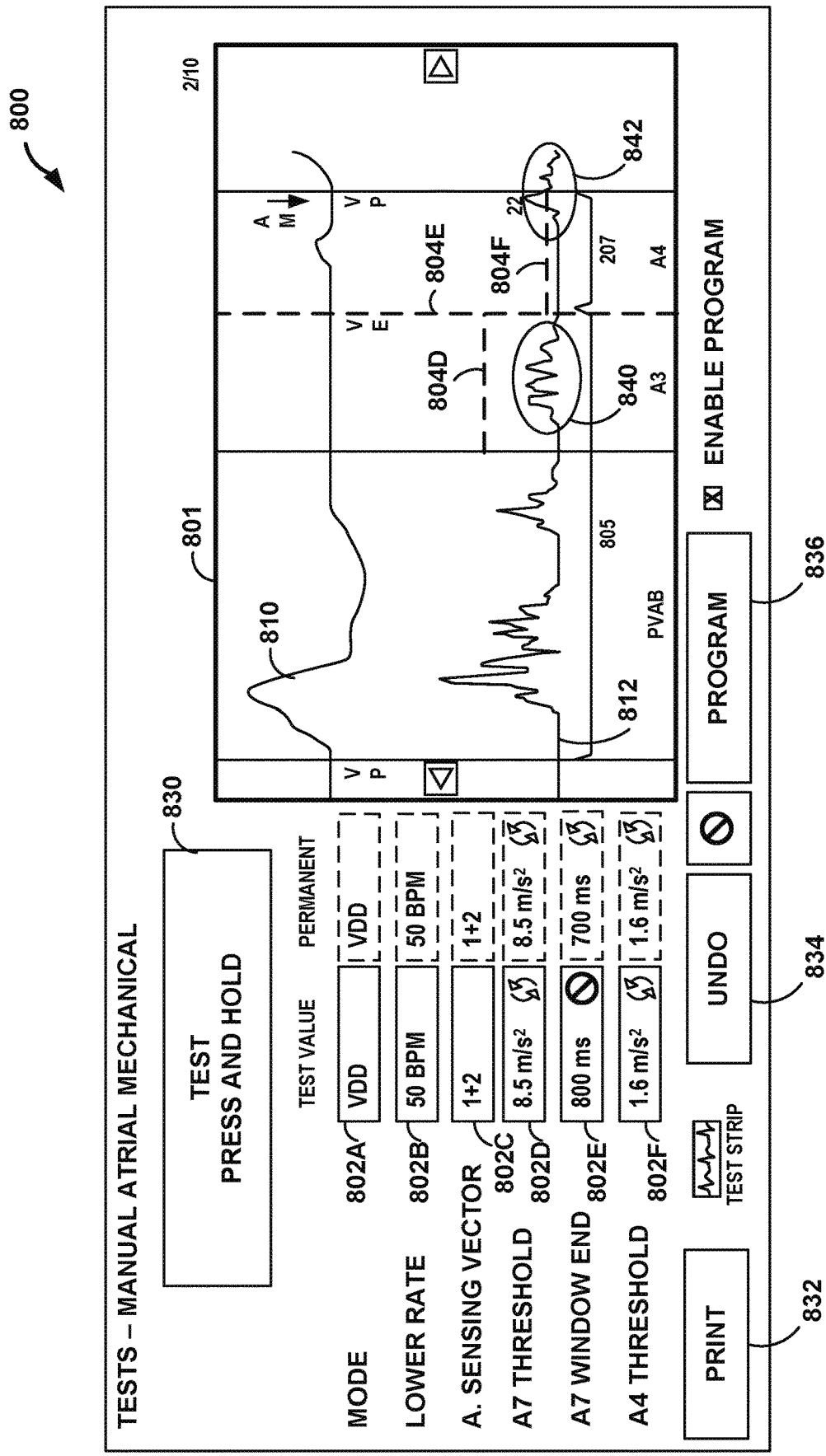
FIG. 8 is an illustration depicting an example Manual Atrial Mechanical (MAM) test interface for adjusting one or more event detection parameters defining mechanical motion sensing of a heart of a patient in accordance with the techniques of the disclosure.

FIG. 8 is an illustration depicting example MAM test interface 800 for adjusting one or more event detection parameters defining mechanical motion sensing of heart 8 of a patient in accordance with the techniques of the disclosure. For convenience, FIG. 8 is described with respect to IMD 14 of FIG. 3 and external programmer 20 of FIG. 4.

MAM test interface 800 depicts an example user interface for conducting a MAM test of IMD 14. The MAM test may be used to configure, optimize, or troubleshoot mechanical motion sensing of motion sensors 212 of IMD 14 by providing an interface for configuring event detection parameters defining the mechanical motion sensing by IMD 14. In some examples, display 408 of external programmer 20 is a touch-sensitive screen that is configured to both display MAM test interface 800 to a user as well as provide touch-sensitive regions of MAM test interface 800 that allow the user to provide input to MAM test interface 800.

MAM test interface 800 includes event detection parameter inputs 802A-802F (hereinafter, "event detection parameter inputs 802"). Event detection parameter inputs 802 include mode 802A, lower rate 802B, sensing vector 802C, A7 threshold 802D, A3 window end 802E, and A4 threshold 802F. MAM test interface 800 may receive, from a user, a selection of one or more event detection parameters via event detection parameter inputs 802 for controlling mechanical motion sensing of heart 8 performed by IMD 14. A "test value" of event detection parameter inputs 802 specifies a value of the corresponding event detection parameter for use in testing mechanical motion sensing via "TEST PRESS AND HOLD" button 830, as described below. A "permanent" value of event detection parameter inputs 802 specifies a value of the corresponding event detection parameter that is programmed into memory 210 of IMD 14 for use in performing mechanical motion sensing of heart 8 when the MAM test is not in effect.

Mode 802A specifies a pacing mode used by IMD 14 for cardiac pacing therapy. Example pacing modes may be specified in accordance with the revised North American Society of Pacing and Electrophysiology/British Pacing and Electrophysiology Group (NASPE/BPEG) generic code for antibradycardia pacing. In some examples, values for mode 802A may include ODO, VDI, VVI, and VDD. In examples according to this disclosure, a VDD mode may include electrical sensing of the activity of the ventricles, and mechanical motion sensing of the activity of the atria.

Lower rate 802B specifies a minimum threshold heart rate of heart 8. Upon IMD 14 determining that a heart rate of heart 8 is less than the minimum threshold heart rate of heart 8, IMD 14 may deliver anti-bradycardia pacing therapy to heart 8.

Sensing vector 802C specifies a sensing vector for use by IMD 14 for sensing mechanical motion data of heart 8. Typically, a sensing vector comprises one or more axes or vectors of motion sensing provided by one or more accelerometers or other motion sensors. In the example of FIG. 8, sensing vector 802C comprises a sensing vector formed from axes 1 and 2 (e.g., "1+2") of motion sensor 212 of IMD 14.

A7 threshold 802D defines a threshold amplitude of the window for sensing an A7 event. Typically, A7 threshold 802D is a minimum threshold for sensing the A7 event. A7 threshold 802D is set above an amplitude of A3 event 840 depicted by representation 812 of the mechanical motion data so as to oversensing A3 event 840. This may avoid misinterpreting sensed A3 event 840 as an atrial systolic event, while still allowing the sensing of an A7 event (e.g., which is a combination of the A3 and A4 events) to be interpreted as an atrial systolic event.

A7 window end 802E defines a boundary separating the window for sensing the A7 event from the window for sensing the A4 event. A7 window end 802E allows a user to define a separation between an A3 event and an A4 event.

A4 threshold 802F defines a threshold amplitude of the window for sensing the A4 event. Typically, A4 threshold 802F is a maximum threshold for sensing the A4 event. A4 threshold 802F is set below an amplitude of A4 event 842 depicted by representation 812 of the mechanical motion data so as to avoid undersensing A4 event 842. This may be to ensure that A4 events of varying amplitude are adequately identified as the atrial systolic event.

MAM test interface 800 includes display region 801. Display region 801 depicts representation 810 of the electrocardiogram data and representation 812 of the mechanical motion data. In some examples, IMD 14 senses the mechanical motion data of heart 8 and external programmer 20 senses, via one or more external leads, the electrocardiogram data. External programmer 20 may displayed the mechanical motion data and the electrocardiogram data with respect to a shared axis, the shared axis representing time.

Display region 801 further includes one or more representations 804D-804F of event detection parameter inputs 802D-802F. For example, representation 804D is a horizontal dotted line depicting a value of A7 threshold 802D with respect to an A3 event depicted by representation 812 of the sensed mechanical motion data. Representation 804E is a vertical dotted line depicting a value of A3 Window End 802E with respect to A3 and A4 events depicted by representation 812 of the sensed mechanical motion data. Representation 804F is a horizontal dotted line depicting a value of A4 threshold 802F with respect to an A4 event depicted by representation 812 of the sensed mechanical motion data. The user may use such representations 804D, 804E, 804F, 810, and 812 for guidance in specifying one or more event detection parameters for defining the mechanical motion sensing of the heart of the patient so as to configure IMD 14 to more accurately detect such mechanical cardiac events. For example, the user may use such representations to determine whether IMD 14 is properly identifying an A4 event, or whether adjustment to event detection parameters is desired so as to more accurately identify the A4 event.

In one example, MAM test interface 800 includes "TEST PRESS AND HOLD" button 830. In response to the user selecting button 830, external programmer 20 transmits the current values of the "test" values of event detection parameter inputs 802 to IMD 14. In response, IMD 14 senses electrogram data and mechanical motion data of heart 8 of the patient over one or more cardiac cycles in accordance with the "test" values of event detection parameter inputs 802. IMD 14 transmits the electrogram data and mechanical motion data of heart 8 to external programmer 20 for display as representation 810 of the electrocardiogram data and representation 812 of the mechanical motion data within display window 801. In this fashion, a user may use external programmer 20 to test various values of event detection parameters to ensure that IMD 14 accurately performs mechanical motion sensing and, in some instances, may accurately identify an A4 event from the mechanical motion data. While not depicted in the example of FIG. 8, display window 801 may depict other types of information to assist in troubleshooting, such as an amplitude of a detected A3, A4, or A7 event or an A3 signal end timing. Additional description regarding the operation of a MAM test is described below with respect to FIG. 11.

In one example, MAM test interface 800 includes "PRINT" button 832. In response to a user selecting button 832, external programmer 20 may print one or more of a test value for event detection parameter inputs 802, a permanent value for event detection parameter inputs 802, or at least a portion of display region 801, such as one or more of representation 810 of electrocardiogram data, representation 812 of mechanical motion data, or representations 804 of event detection parameter inputs 802. For example, external programmer 20 may collect multiple cardiac cycles and print at least a portion of display region 801 for all of the collected cardiac cycles or at least a portion of display region 801 for a user-selectable subset of the collected cardiac cycles.

In one example, MAM test interface 800 includes "UNDO" button 834. In response to a user selecting button 832, external programmer 20 may undo a previous input from the user. For example, external programmer 20 may return a value of a "test" or "permanent" value for one of event detection parameter inputs 802 from a value specified by the user to a previous value.

In one example, MAM test interface 800 includes "PROGRAM" button 834. In response to a user selecting button 836, external programmer 20 may commit "test" values of event detection parameter inputs 802 to "permanent" values stored in memory 210 of IMD 14 for use in performing mechanical motion sensing of heart 8. In some examples, external programmer 20 may evaluate whether the "test" values of event detection parameter inputs 802 include any incompatible programming combinations (e.g., interlocks) that the user must resolve prior to committing the "test" values to the permanent values stored in memory 210. In some examples, upon detecting incompatible programming combinations, MAM test interface 800 may present a notification to the user of the incompatible programming combinations and require the user to navigate to another screen to resolve the incompatible programming combinations. In some examples, external programmer 20 may allow the user to adjust the relevant permanent values on the same screen, suggest new values that resolve the incompatible programming, or copy the new values to the main parameters screen to be resolved there. A user may therefore test various values of event detection parameter inputs 802, and upon determining that IMD 14 accurately performs mechanical motion sensing in accordance with selected "test" values, the user may program the "test" values into memory 210 of IMD 14 for subsequent use in mechanical motion sensing and cardiac therapy delivery.

Figure 9:
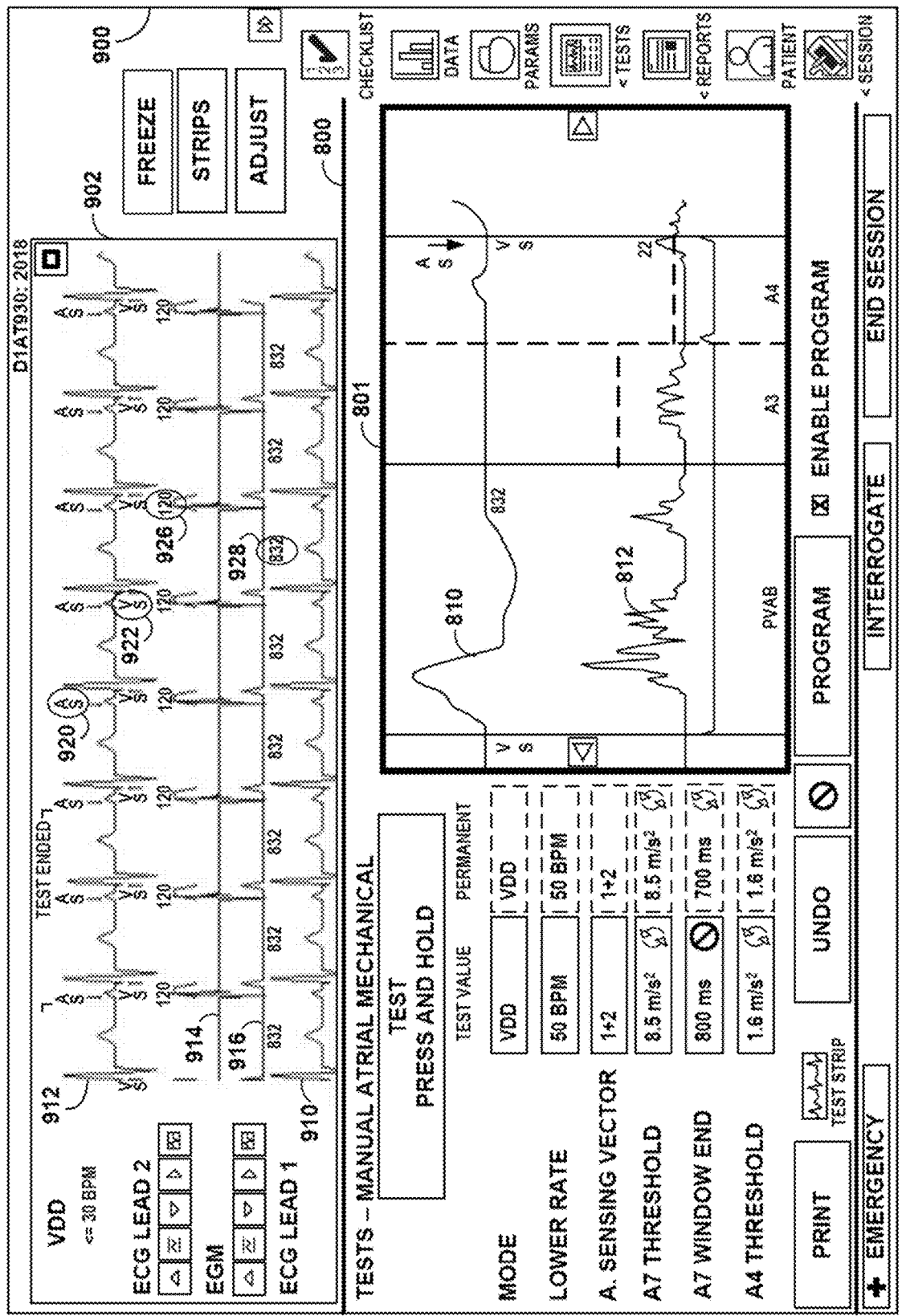
FIG. 9 is an illustration depicting an example user interface for adjusting one or more event detection parameters defining mechanical motion sensing of a heart of a patient in accordance with the techniques of the disclosure.

FIG. 9 is an illustration depicting an example user interface 900 for adjusting one or more event detection parameters defining mechanical motion sensing of heart 8 of a patient in accordance with the techniques of the disclosure. For convenience, FIG. 9 is described with respect to IMD 14 of FIG. 3 and external programmer 20 of FIG. 4. In some examples, user interface 900 depicts an example user interface for interacting with external programmer 20. In some examples, display 408 of external programmer 20 is a touch-sensitive screen that is configured to both display user interface 900 to a user as well as provide touch-sensitive regions of user interface 900 that allow the user to provide input to user interface 900. In some examples, user interface 900 includes MAM test interface 800, which may operate in a substantially similar fashion to MAM test interface 800 of FIG. 8.

User interface 900 further includes live waveform display 902. Live waveform display 902 depicts representations 910 and 912 of two channels of electrocardiogram signals sensed via one or more electrodes disposed on one or more leads external to the patient and representation 914 of one channel of electrogram data sensed from heart 8 via one or more electrodes of IMD 14. In some examples, a user may customize the vertical location of each of representations 910, 912, 914, and 916. In some examples, external programmer 20 obtains the two channels of electrocardiogram signals depicted by representations 910 and 912 via one or more external leads interfaced with ports 412 of external programmer 20 and obtains the electrogram data depicted by representation 914 from IMD 14.

The example channels of data depicted in live waveform display 902 are provided as examples only. In other examples not depicted in FIG. 9, live waveform display 902 may include various combinations of one or more channels of electrocardiogram data obtained by programmer 20, one or more channels of electrogram data obtained by IMD 14, and/or one or more channels of mechanical motion data obtained by IMD 14.

The example of FIG. 9 further illustrates detected events 920 and 922 overlaid upon electrocardiogram signal 910. Events 920 are occurrences of atrial sensed events denoted in FIG. 9 as "AS." Events 922 are occurrences of ventricular sensed events denoted in FIG. 9 as "VS." Furthermore, the example of FIG. 9 includes representation 916 of marker channel data that includes timing intervals 926 and 928. Timing intervals 926 correspond to a time elapsed between consecutive ventricular events, such as atrial sensed events 920, ventricular sensed events 922, or the ventricular end (VE) events of FIG. 8 (not depicted in FIG. 9). Timing intervals 728 correspond to intervals between atrial events and the following ventricular events.

In contrast to display region 801 of MAM test interface 800, which depicts representation 810 of the electrocardiogram data and representation 812 of the mechanical motion data over, e.g., one or a few cardiac cycles, live waveform display 902 may depict representations 910, 912, 914, and 916 over a plurality of cardiac cycles and may, in some examples be presented in real-time or near real-time, e.g., as a strip chart. A user such as a clinician may use user interface 900 during programming such that external programmer 20 communicates with IMD 14 to retrieve electrogram data sensed by IMD 14 and may also be operatively coupled to electrocardiogram leads to receive the electrocardiogram signals.

In the example of FIG. 9, user interface 900 depicts representations 910, 912, 914, and 916 while the MAM test is running (e.g., while the user has selected the "TEST PRESS AND HOLD" button). In some examples, after the MAM test completes, the user may select a specific cardiac cycle (or several cardiac cycles) depicted within representations 910, 912, 914, and 916 of live waveform display 902 collected during the MAM test. In response to the selection, display region 801 of MAM test interface 800 depicts representation 810 of the electrocardiogram data and representation 812 of the mechanical motion data for the cardiac cycle(s) selected by the user, as well as a representation of the event detection parameters used by IMD 14 in relation to representation 812 of the mechanical motion data sensed during the MAM test. In this fashion, a user may use external programmer 20 to observe various cardiac cycles of heart 8 to ensure that IMD 14 accurately performs mechanical motion sensing and, in some instances, may accurately identify an A4 event from the mechanical motion data, over numerous cardiac cycles of heart 8.

Figure 10:
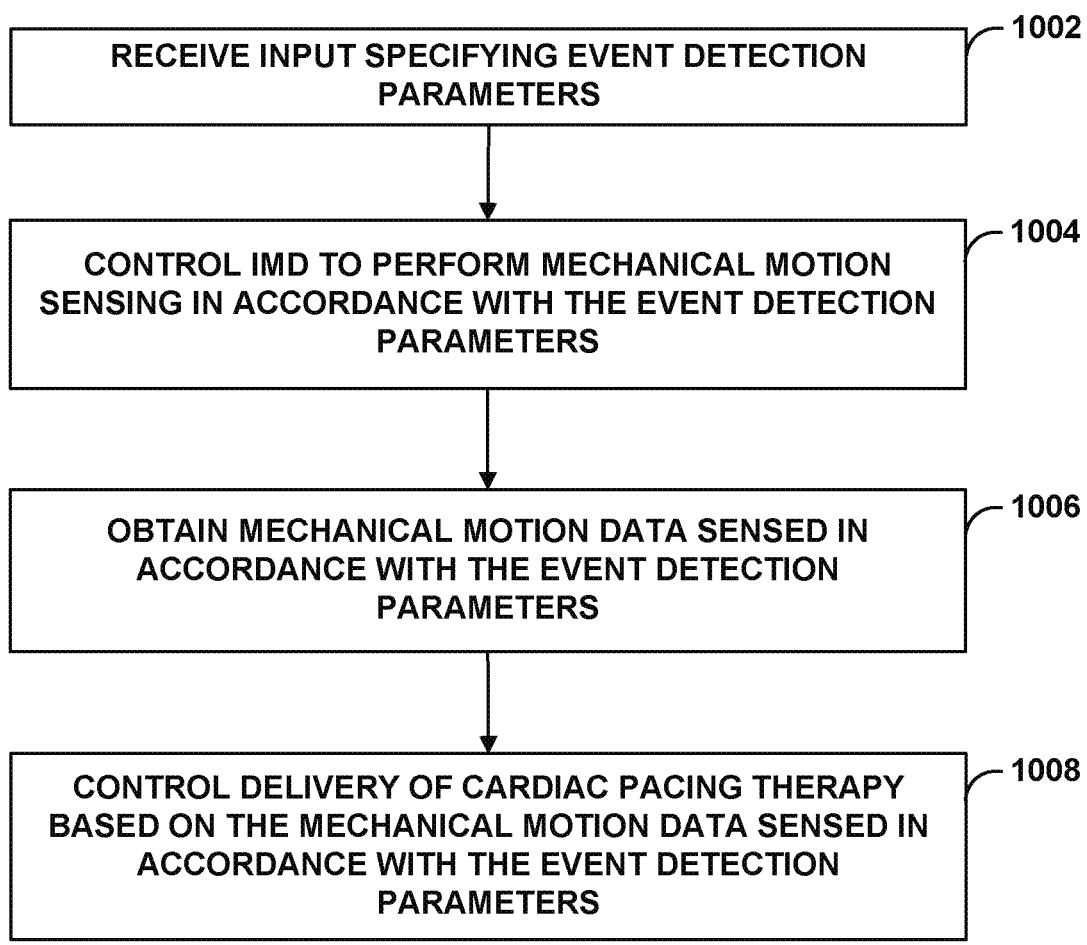
FIG. 10 is a flowchart illustrating an example operation for adjusting one or more event detection parameters defining mechanical motion sensing of a heart of a patient in accordance with the techniques of the disclosure.

FIG. 10 is a flowchart illustrating an example operation for adjusting one or more event detection parameters defining mechanical motion sensing of a heart of a patient in accordance with the techniques of the disclosure. For convenience, FIG. 10 is described with respect to FIG. 1.

External programmer 20 receives, from a user, an input specifying one or more event detection parameters (1002). The one or more event detection parameters define mechanical motion sensing of heart 8 of a patient by one or more motion sensors of IMD 14. The one or more event detection parameters may specify, for example, a threshold amplitude of a window for sensing an A7 event, a threshold amplitude of a window for sensing an A4 event, a boundary separating the window for sensing an A7 event from the window for sensing an A4 event, an end of the window for sensing an A7 event, or a beginning of the window for sensing an A4 event, etc.

External programmer 20 controls IMD 14 to perform mechanical motion sensing in accordance with the one or more event detection parameters (1004). For example, external programmer 14 transmits the one or more event detection parameters to IMD 14 to control IMD 14 to perform mechanical motion sensing of heart 8 in accordance with the one or more event detection parameters.

IMD 14 performs mechanical motion sensing of heart 8 to obtain mechanical motion data sensed in accordance with the one or more event detection parameters (1006). For example, IMD 14 may identify particular features from the mechanical motion data of heart 8 sensed in accordance with the one or more event detection parameters. These features may include, e.g., an A4 event of heart 8 or a measured amplitude of an A3, A4, or A7 event. To identify, e.g., an A4 event, IMD 14 may use one or more detection windows, such as a detection window for sensing an A7 event and/or a detection window for sensing an A4 event. Such detection windows are defined by the one or more event detection parameters received from the user.

IMD 14 controls delivery of cardiac pacing therapy based on the mechanical motion data sensed in accordance with the one or more event detection parameters (1008). For example, IMD 14 delivers one or more ventricular pacing pulses at a time subsequent to the A4 event by a target AV interval. In this fashion, IMD 14 may maintain a target AV interval between a detected atrial systolic event and delivered ventricular pacing pulses so as to promote synchrony between atrial activation and ventricular activation.

In some examples, IMD 14 senses, via one or more electrodes, electrogram data of heart 8. IMD 14 transmits the electrogram data and mechanical motion data to external programmer 20. External programmer 20 displays, to the user, a representation of the electrocardiogram data of heart 8 and the electrogram data of heart 8, as well as a representation of the mechanical motion data of heart 8. External programmer 20 may further display, to the user, a representation of the one or more event detection parameters with respect to the representation of the mechanical motion data of heart 8. In some examples, a user may use the representations as guidance to identify particular events, such as A3, A4, and A7 events, present within the representation of the mechanical motion data of heart 8. Additionally, the user may use the representations as guidance for adjusting the one or more event detection parameters used by IMD 14 to perform mechanical motion sensing.

Figure 11:
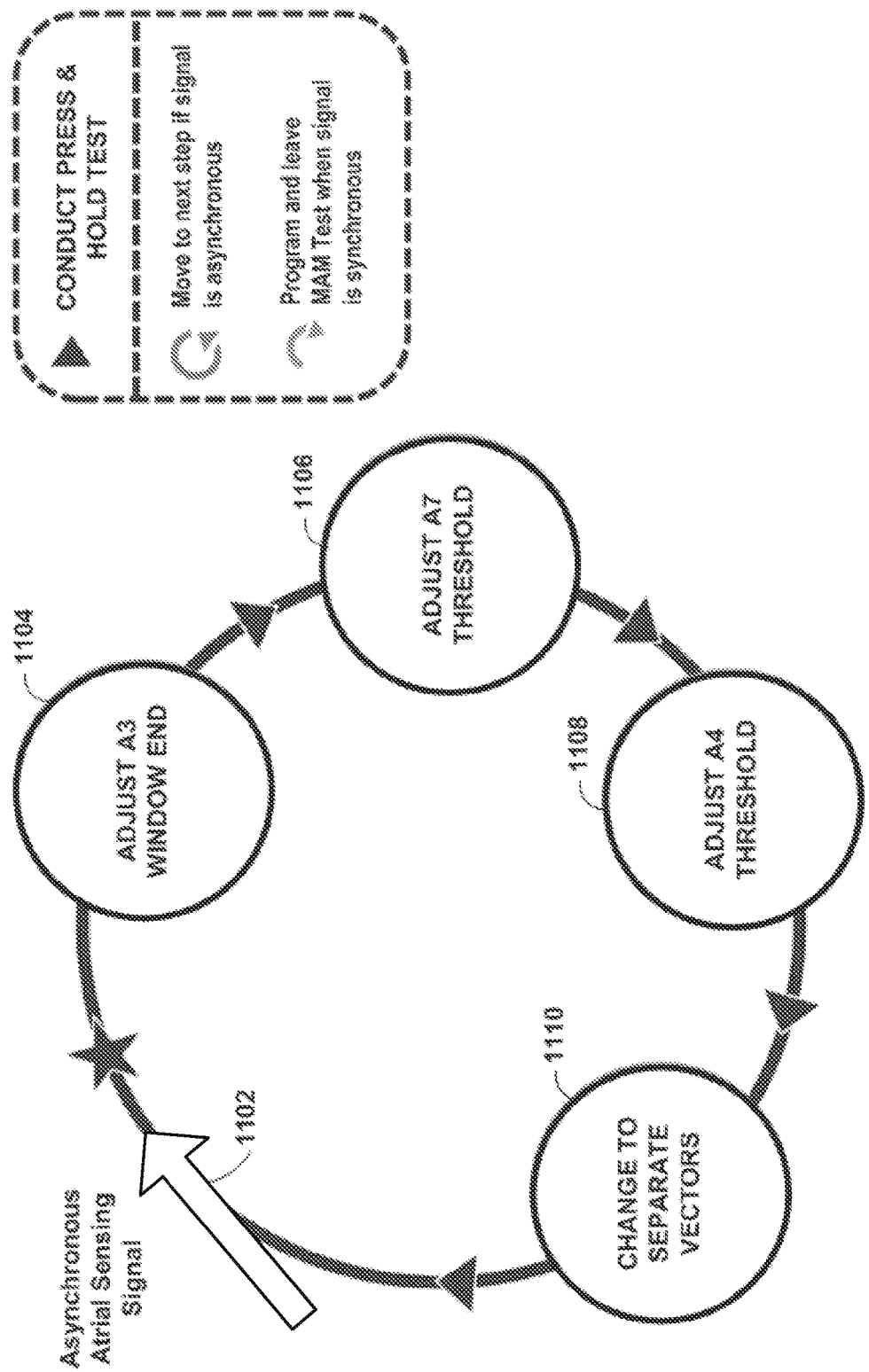
FIG. 11 is a flowchart illustrating an example operation for adjusting one or more event detection parameters defining mechanical motion sensing of a heart of a patient in accordance with the techniques of the disclosure.

FIG. 11 is a flowchart illustrating an example operation for adjusting one or more event detection parameters defining mechanical motion sensing of a heart of a patient in accordance with the techniques of the disclosure. For convenience, FIG. 11 is described with respect to FIGS. 1 and 8.

FIG. 11 may depict an example of the MAM test described with respect to FIG. 8 for configuring, optimizing, or troubleshooting mechanical motion sensing of motion sensors 212 of IMD 14. The MAM test provides a troubleshooting aid that may allow mechanical motion sensing for AV synchronous pacing viable for use in clinical settings. The MAM test is an in-office test manually performed by a user such as a clinician. The MAM test may be used to troubleshoot mechanical motion signals sensed by IMD 14 to determine whether appropriate sensing is occurring. If appropriate sensing is not occurring, the user can adjust event detection parameters of IMD 14 to resolve the issue. The in-office MAM test simplifies the identification of different components of the mechanical motion data and assists the user in identifying an impact of current event detection parameters on the mechanical motion sensing operation. Further, the MAM test enables a user to program IMD 14 with event detection parameters directly from the test display.

In the example of FIG. 11, IMD 14 performs mechanical motion sensing of heart 8 in accordance with one or more event detection parameters. Furthermore, in the example of FIG. 11, the one or more event detection parameters are misconfigured such that, when IMD 14 performs mechanical motion sensing of heart 8 in accordance with one or more event detection parameters, IMD 14 obtains an asynchronous atrial sensing signal (1102).

As described above, external programmer 20 is configured to receive, via MAM test interface 800 and from a user, one or more event detection parameters. The one or more event detection parameters define mechanical motion sensing of heart 8 of a patient by one or more motion sensors of IMD 14. In the example of FIG. 11, the one or more event detection parameters specify an end of a window for sensing an A7 event, a threshold amplitude of the window for sensing an A7 event, a threshold amplitude of a window for sensing an A4 event, and one or more sensing vectors for sensing mechanical motion data.

To remedy the asynchronous atrial sensing signal, external programmer 20 receives an adjustment to the end of the window for sensing the A7 event (1104). Typically, the end of the window for sensing the A7 event should be between an A7 event waveform and an A4 event waveform. In addition or in the alternative, external programmer 20 receives an adjustment to a boundary separating the window for sensing the A7 event from the window for sensing the A4 event or a beginning of the window for sensing the A4 event. After receiving the adjustment, external programmer receives, from the user, an instruction to conduct a MAM test by selecting "TEST PRESS AND HOLD" button 830 of MAM test interface 800. In response to the user selecting button 830, external programmer 20 transmits the adjusted event detection parameter to IMD 14. IMD 14 senses mechanical motion data of heart 8 of the patient over one or more cardiac cycles in accordance with the received adjusted event detection parameter. IMD 14 transmits the mechanical motion data of heart 8 to external programmer 20 for display to the user. In response to determining that IMD 14 obtains a synchronous atrial sensing signal, external programmer 20 receives, from the user, an input to program IMD 14 with the adjusted event detection parameter for subsequent mechanical motion sensing.

In response to determining that IMD 14 continues to obtain an asynchronous atrial sensing signal, external programmer 20 receives, from the user, an adjustment to the threshold amplitude of the window for sensing the A7 event (1106). Typically, the threshold amplitude of the window for sensing the A7 event should be above an amplitude of an A3 event waveform. After receiving the adjustment, external programmer receives, from the user, an instruction to conduct a MAM test by selecting "TEST PRESS AND HOLD" button 830 of MAM test interface 800. In response to the user selecting button 830, external programmer 20 transmits the adjusted event detection parameter to IMD 14. IMD 14 senses mechanical motion data of heart 8 of the patient over one or more cardiac cycles in accordance with the received adjusted event detection parameter. IMD 14 transmits the mechanical motion data of heart 8 to external programmer 20 for display to the user. In some examples, in response to determining that IMD 14 obtains a synchronous atrial sensing signal, external programmer 20 receives, from a user, an input to program IMD 14 with the adjusted event detection parameter for subsequent mechanical motion sensing. In other examples, external programmer 20 performs an initial assessment of the AV synchrony operation of IMD 14 and outputs, to the user, guidance for adjustments to one or more event detection parameters for subsequent mechanical motion sensing by IMD 14.

In response to determining that IMD 14 continues to obtain an asynchronous atrial sensing signal, external programmer 20 receives, from the user, an adjustment to the threshold amplitude of the window for sensing the A4 event (1108). Typically, the threshold amplitude of the window for sensing the A4 event should be slightly less than a maximum amplitude of the A4 event waveform. After receiving the adjustment, external programmer receives, from the user, an instruction to conduct a MAM test by selecting "TEST PRESS AND HOLD" button 830 of MAM test interface 800. In response to the user selecting button 830, external programmer 20 transmits the adjusted event detection parameter to IMD 14. IMD 14 senses mechanical motion data of heart 8 of the patient over one or more cardiac cycles in accordance with the received adjusted event detection parameter. IMD 14 transmits the mechanical motion data of heart 8 to external programmer 20 for display to the user. In response to determining that IMD 14 obtains a synchronous atrial sensing signal, external programmer 20 receives, from a user, an input to program IMD 14 with the adjusted event detection parameter for subsequent mechanical motion sensing.

In response to determining that IMD 14 continues to obtain an asynchronous atrial sensing signal, external programmer 20 receives, from the user, an adjustment to the one or more sensing vectors for sensing mechanical motion data (1110). For example, IMD 14 may be configured to use, e.g., sensing vector 1+2 comprising a first axis or vector of motion and a second axis or vector of motion of motion sensors 212 of IMD 14. A user may switch between the axes or vectors of motion of motion sensors 212 (e.g., by selecting various single or multiple-axes combinations of motion sensors 212) to examine a size of different sensed waveforms. Typically, a motion sensing vector or vector combination that has a least amount of noise is selected for use. After receiving the adjustment, external programmer receives, from the user, an instruction to conduct a MAM test by selecting "TEST PRESS AND HOLD" button 830 of MAM test interface 800. In response to the user selecting button 830, external programmer 20 transmits the adjusted event detection parameter to IMD 14. IMD 14 senses mechanical motion data of heart 8 of the patient over one or more cardiac cycles in accordance with the received adjusted event detection parameter. IMD 14 transmits the mechanical motion data of heart 8 to external programmer 20 for display to the user.

In response to determining that IMD 14 obtains a synchronous atrial sensing signal, external programmer 20 receives, from a user, an input to program IMD 14 with the adjusted event detection parameter for subsequent mechanical motion sensing. In response to determining that IMD 14 continues to obtain an asynchronous atrial sensing signal, the operations of (1104), (1106), (1108) may be continued using different sensing vectors until IMD 14 obtains a synchronous atrial sensing signal.

In some examples, the MAM test described herein allows a user to specify a desired pacing therapy that uses atrial mechanical motion sensing. In some examples, the MAM test may record one or more cardiac cycles for display to the user. In some examples, the MAM test may record up to about 10 seconds of mechanical motion waveform data for display to the user. In some examples, the MAM test may display a single waveform view of each recorded mechanical motion waveform as selected by the user. In some examples, the MAM test enables a user to adjust one or more event detection parameters and display changes in sensing threshold compared to the mechanical motion waveform. In some examples, the MAM test enables a user to re-execute a test with new parameters specified by the user. In some examples, the MAM test enables a user to program event detection parameters from the test screen. In some examples, the MAM test generates a stored record of data obtained during testing. In some examples, the MAM test provides mechanical motion waveform statistics to the user generated from data obtained during testing.

Figure 12A:
FIGS. 12A-12B are illustrations depicting another example user interface for adjusting one or more event detection parameters defining mechanical motion sensing of a heart of a patient in accordance with the techniques of the disclosure.
Figure 12B:

FIGS. 12A-12B are illustrations depicting another example user interface for adjusting one or more event detection parameters defining mechanical motion sensing of a heart of a patient in accordance with the techniques of the disclosure. In some examples, the user interface of FIGS. 12A-12B may operate in a substantially similar fashion as user interface 800 of FIG. 8 and/or user interface 900 of FIG. 9.

Figure 13:
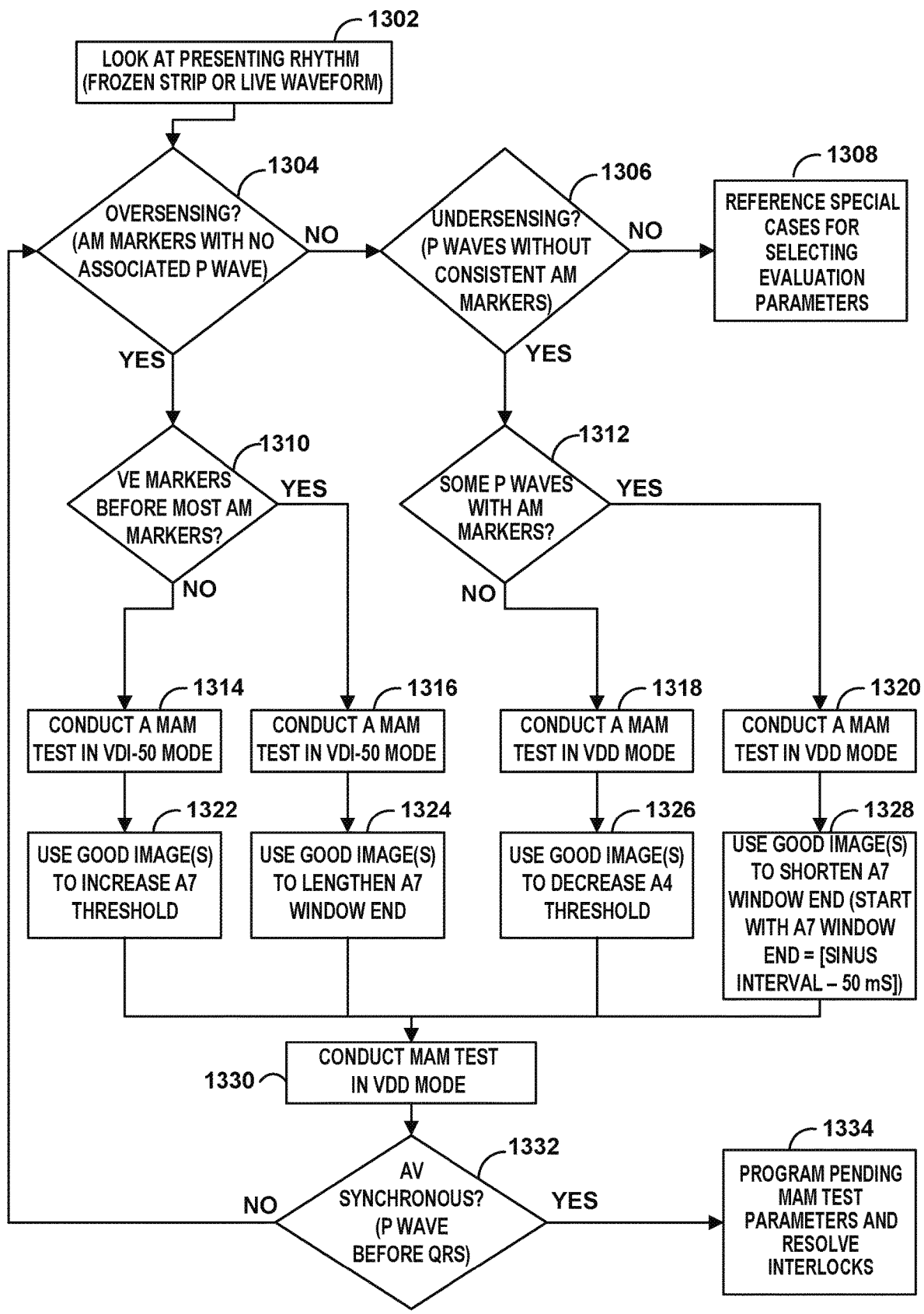
FIG. 13 is a flowchart illustrating an example operation for adjusting one or more event detection parameters defining mechanical motion sensing of a heart of a patient in accordance with the techniques of the disclosure.
Figure 14A:
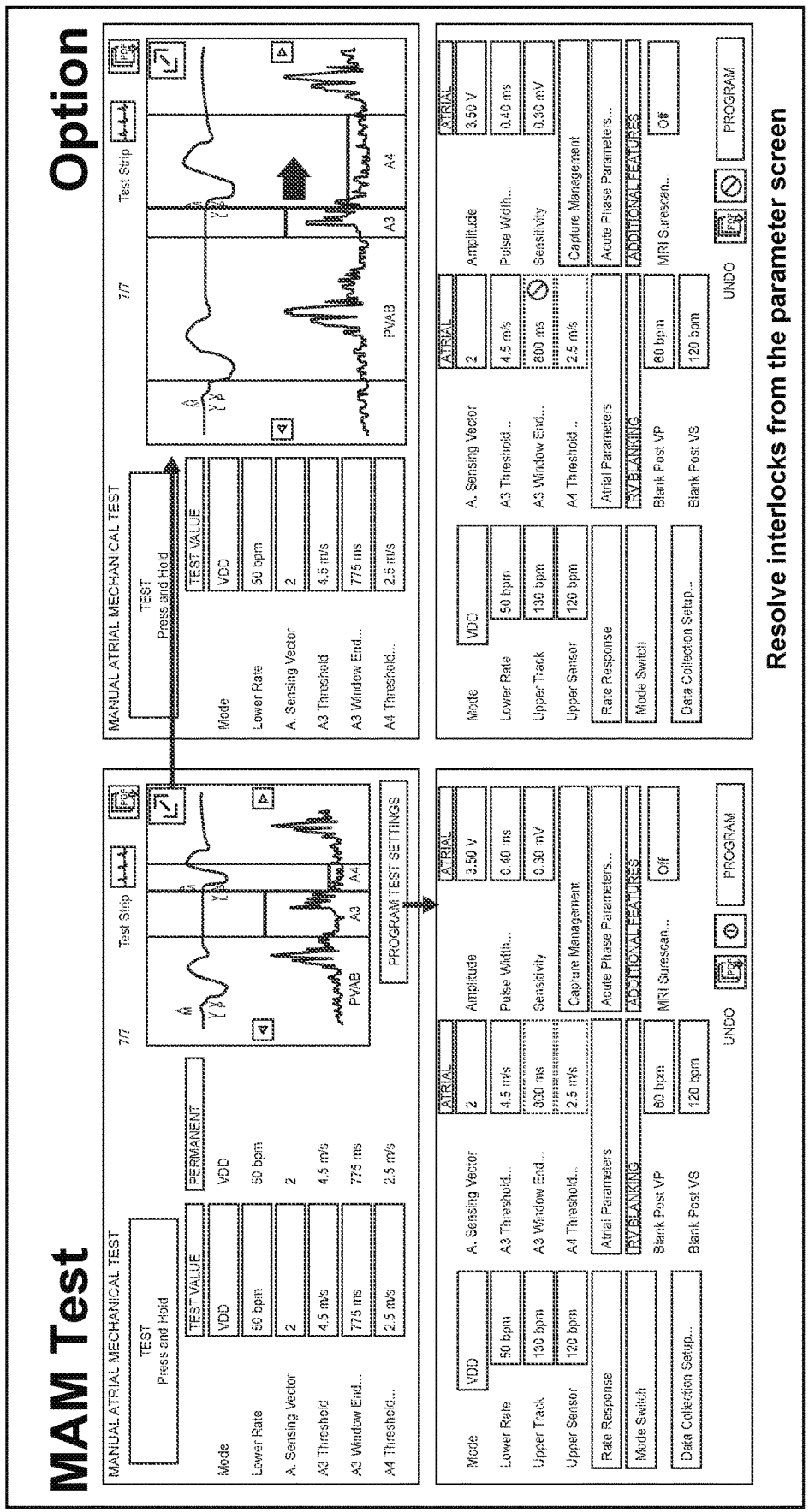
Figure 14C:
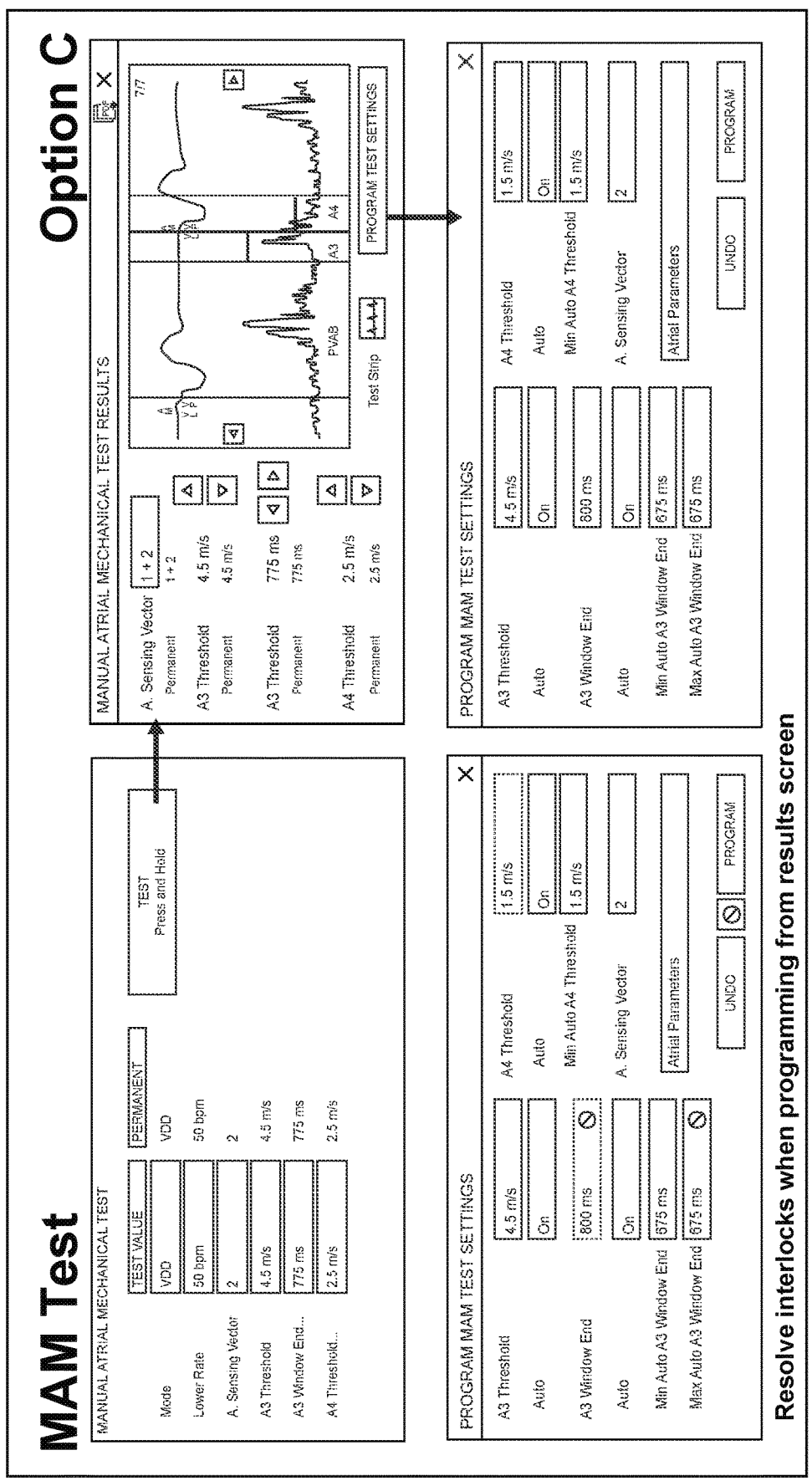
Figure 14E:
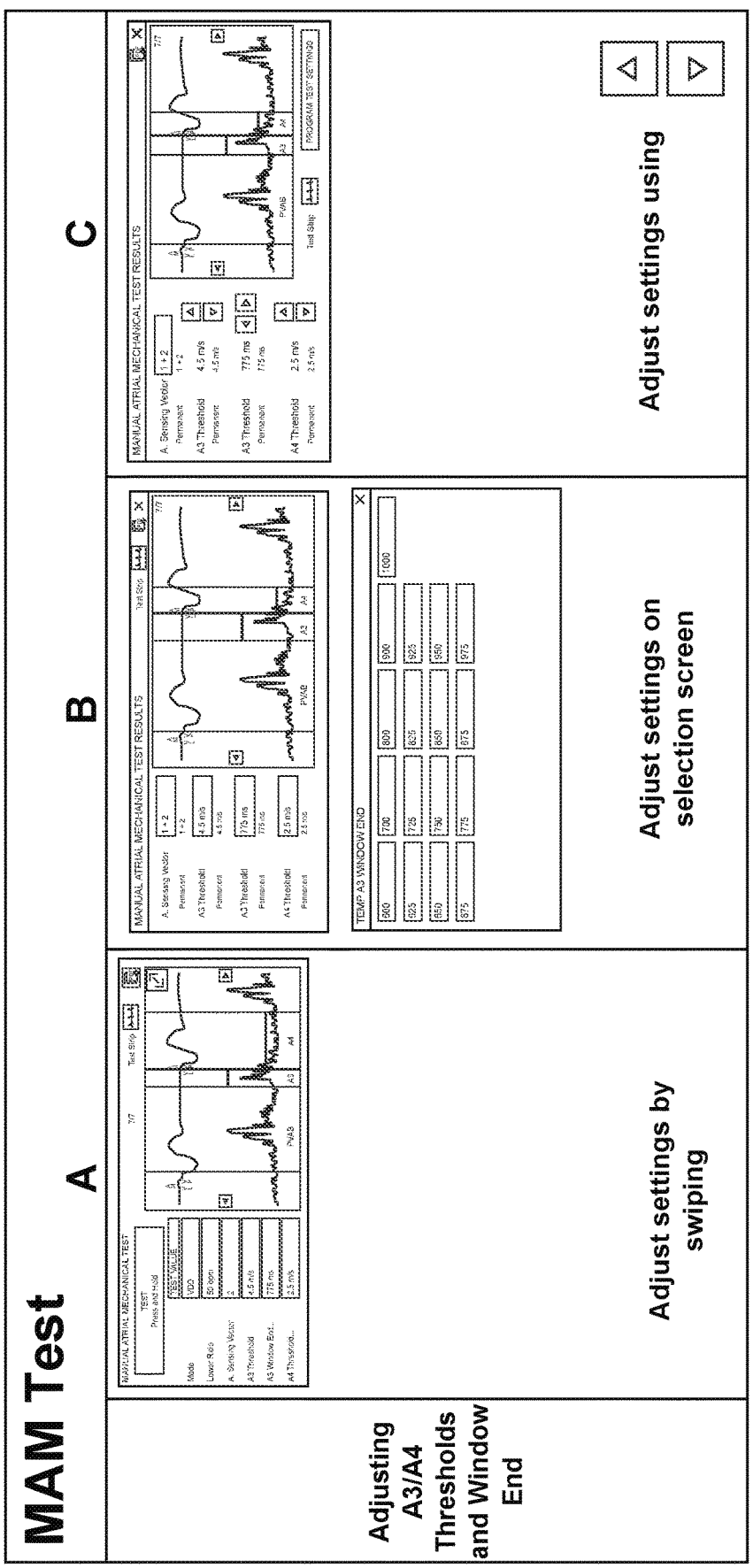

FIG. 13 is a flowchart illustrating an example operation for adjusting one or more event detection parameters defining mechanical motion sensing of a heart of a patient in accordance with the techniques of the disclosure. Specifically, FIG. 13 illustrates an example operation for troubleshooting mechanical motion sensing of motion sensors of an IMD. The operation of FIG. 13 may be performed in response to detecting asynchronous AV (e.g., the occurrence of a P wave before each QRS complex). For convenience, FIG. 13 is described with respect to FIG. 1.

With respect to the example of FIG. 13, a clinician looks at a presenting rhythm (e.g., a frozen strip or live waveform) (1302). The clinician determines whether IMD 14 is oversensing (e.g., AM markers with no associated P wave) (1304). In response to determining that IMD 14 is oversensing (e.g., "YES" block of 1304), the clinician determines whether VE markers occur before most AM markers (1310). In response to determining that the VE markers do not occur before most AM markers (e.g., "NO" block of 1310), the clinician controls external programmer 20 to conduct a MAM test in VDI-50 mode (1314). External programmer 20 presents one or more images of the mechanical motion data sensed during the MAM test, and the clinician uses the images to increase an A7 threshold (1322).

In response to determining that the VE markers occur before most AM markers (e.g., "YES" block of 1310), the clinician controls external programmer 20 to conduct a MAM test in VDI-50 mode (1316). External programmer 20 presents one or more images of the mechanical motion data sensed during the MAM test, and the clinician uses the images to lengthen an A7 window end (1324).

In response to determining that IMD 14 is not oversensing (e.g., "NO" block of 1304), the clinician determines whether IMD 14 is undersensing (e.g., P waves without consistent AM markers) (1306). In response to determining that IMD 14 is undersensing (e.g., "YES" block of 1306), the clinician determines whether IMD 14 detects some P waves with AM markers (1312). In response to determining that IMD 14 does not detect some P waves with AM markers (e.g., "NO" block of 1312), the clinician controls external programmer 20 to conduct a MAM test in VDD mode (1318). External programmer 20 presents one or more images of the mechanical motion data sensed during the MAM test, and the clinician uses the images to decrease an A4 threshold (1326).

In response to determining that IMD 14 detects some P waves with AM markers (e.g., "YES" block of 1312), the clinician controls external programmer 20 to conduct a MAM test in VDD mode (1320). External programmer 20 presents one or more images of the mechanical motion data sensed during the MAM test, and the clinician uses the images to shorten an A7 window end (in some examples, the clinician may start with an A7 window end that is equal to a sinus interval minus 50 milliseconds) (1328).

After steps 1322, 1324, 1326, or 1328, the clinician controls external programmer 20 to conduct a MAM test in VDD mode (1330). The clinician determines whether the AV is synchronous (e.g., the P wave occurs before the QRS complex) (1332). In response to determining that the AV is synchronous (e.g., "YES" block of 1332), the clinician controls external programmer 20 to program IMD 14 with the pending MAM test parameters and resolve interlocks (e.g., incompatible programming combinations) (1334).

In response to determining that the AV is asynchronous (e.g., "NO" block of 1332), the operation returns to step 1304 to determine whether oversensing occurs. In response to determining that IMD 14 is not undersensing (e.g., "NO" block of 1306), the clinician may need to reference special cases for selecting evaluation parameters for IMD 14 (1308).

FIGS. 14A-14G are illustrations depicting example user interfaces for adjusting one or more event detection parameters defining mechanical motion sensing of a heart of a patient in accordance with the techniques of the disclosure. In some examples, the user interfaces of FIGS. 14A-14G depict example user interfaces for conducting a MAM test of IMD 14 of FIG. 1 to configure, optimize, or troubleshoot mechanical motion sensing of motion sensors 212 of IMD 14. In some examples, the user interfaces of FIGS. 14A-12G may operate in a substantially similar fashion as user interface 800 of FIG. 8 and/or user interface 900 of FIG. 9.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules associated with, for example, a medical device.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Various examples have been described. These and other examples are within the scope of the following claims.

What is claimed is:

1. A method comprising:
   receiving, by processing circuitry and from a user, a first input specifying one or more first event detection parameters defining mechanical motion sensing of a heart of a patient by one or more motion sensors of an implantable medical device (IMD);
   controlling, by the processing circuitry, the IMD to perform mechanical motion sensing of the heart of the patient in accordance with the one or more first event detection parameters;
   obtaining, by the processing circuitry, first mechanical motion data of the heart of the patient sensed in accordance with the one or more first event detection parameters;
   determining, by the processing circuitry, that the first mechanical motion data comprises an asynchronous atrioventricular (AV) signal;
   in response to determining that the first mechanical motion data comprises the asynchronous AV signal, receiving, by the processing circuitry, a second input specifying one or more second event detection parameters;
   obtaining, by the processing circuitry, second mechanical motion data of the heart of the patient sensed in accordance with the one or more second event detection parameters;
   determining, by the processing circuitry, that the second mechanical motion data comprises a synchronous AV signal; and
   in response to determining that the second mechanical motion data comprises the synchronous AV signal, controlling, by the processing circuitry, the IMD to deliver cardiac pacing therapy based on the second mechanical motion data of the heart of the patient sensed in accordance with the one or more second event detection parameters.

2. The method of claim 1, further comprising outputting, by the processing circuitry and for display, a representation of at least one of electrocardiogram data or electrogram data of the heart of the patient.

3. The method of claim 1, further comprising outputting, by the processing circuitry and for display, a representation of the second mechanical motion data of the heart of the patient.

4. The method of claim 3, wherein the representation of the second mechanical motion data of the heart of the patient comprises a representation of the second mechanical motion data of the heart of the patient over a plurality of cardiac cycles.

5. The method of claim 1, further comprising:
   outputting, by the processing circuitry and for display, a first representation of at least one of electrocardiogram data or electrogram data of the heart of the patient; and
   outputting, by the processing circuitry and for display, a second representation of the second mechanical motion data of the heart of the patient,
   wherein the first representation and second representation are displayed with respect to a shared axis, the shared axis representing time.

6. The method of claim 1, wherein receiving the second input specifying the one or more second event detection parameters comprises receiving an input specifying a threshold amplitude of a window for sensing an A7 event, wherein the A7 event corresponds to a fusion of an A3 event and an A4 event, the A3 event corresponds to ventricular mechanical diastole of the heart of the patient, and the A4 event corresponds to atrial mechanical systole of the heart of the patient.

7. The method of claim 1, wherein receiving the second input specifying the one or more event detection parameters defining mechanical motion sensing of the heart of the patient comprises receiving an input specifying a threshold amplitude of a window for sensing an A4 event, wherein the A4 event corresponds to atrial mechanical systole of the heart of the patient.

8. The method of claim 1, wherein receiving the second input specifying the one or more event detection parameters defining mechanical motion sensing of the heart of the patient comprises receiving an input specifying at least one of:
   a boundary separating a window for sensing an A7 event from a window for sensing an A4 event;
   an end of a window for sensing an A7 event; or
   a beginning of a window for sensing an A7 event,
   wherein the A7 event corresponds to a fusion of an A3 event and an A4 event, the A3 event corresponds to ventricular mechanical diastole of the heart of the patient, and the A4 event corresponds to atrial mechanical systole of the heart of the patient.

9. The method of claim 1, further comprising transmitting, by the processing circuitry, instructions to the IMD configured to cause the IMD to store the one or more second event detection parameters permanently in a memory of the IMD.

10. The method of claim 1, further comprising outputting, by the processing circuitry and for display to the user, an indication that the first input specifying the one or more first event detection parameters specifies one or more incompatible event detection parameters.

11. The method of claim 1, wherein receiving the second input specifying the one or more second event detection parameters comprises:
    receiving a third input specifying a first threshold amplitude of a first window for sensing an A4 event, wherein the A4 event corresponds to atrial mechanical systole of the heart of the patient;
    receiving a fourth input specifying a second threshold amplitude of a second window for sensing an A7 event, wherein the A7 event corresponds to a fusion of an A3 event and an A4 event, and wherein the A3 event corresponds to ventricular mechanical diastole of the heart of the patient; and
    receiving a fifth input specifying at least one of:
        a boundary separating the second window for sensing an A7 event from the first window for sensing an A4 event;
        an end of the second window for sensing an A7 event; or
        a beginning of the second window for sensing an A7 event.

12. The method of claim 1, wherein receiving the second input specifying the one or more event detection parameters defining mechanical motion sensing of the heart of the patient comprises:
    receiving a third input specifying a first threshold amplitude of a first window for sensing an A4 event, wherein the A4 event corresponds to atrial mechanical systole of the heart of the patient; and
    receiving a fourth input specifying a second threshold amplitude of a second window for sensing an A7 event, wherein the A7 event corresponds to a fusion of an A3 event and an A4 event, and wherein the A3 event corresponds to ventricular mechanical diastole of the heart of the patient.

13. The method of claim 1, wherein receiving the second input specifying the one or more event detection parameters defining mechanical motion sensing of the heart of the patient comprises:
    receiving a third input specifying a first threshold amplitude of a first window for sensing an A7 event, wherein the A7 event corresponds to a fusion of an A3 event and an A4 event, the A3 event corresponds to ventricular mechanical diastole of the heart of the patient, and the A4 event corresponds to atrial mechanical systole of the heart of the patient; and
    receiving a fourth input specifying at least one of:
        a boundary separating the first window for sensing an A7 event from a second window for sensing an A4 event;
        an end of the first window for sensing an A7 event; or
        a beginning of the first window for sensing an A7 event.

14. The method of claim 1, wherein receiving the second input specifying the one or more event detection parameters defining mechanical motion sensing of the heart of the patient comprises:
    receiving a third input specifying a first threshold amplitude of a first window for sensing an A4 event, wherein the A4 event corresponds to atrial mechanical systole of the heart of the patient;
    receiving a fourth input specifying at least one of:
        a boundary separating a second window for sensing an A7 event from the first window for sensing the A4 event;
        an end of the second window for sensing an A7 event; or
        a beginning of the second window for sensing an A7 event, wherein the A7 event corresponds to a fusion of an A3 event and an A4 event, and wherein the A3 event corresponds to ventricular mechanical diastole of the heart of the patient.

15. The method of claim 1, wherein determining that the first mechanical motion data comprises the asynchronous AV signal comprises determining whether an instance of a P-wave occurs prior to an instance of a QRS complex.

16. A medical device comprising processing circuitry configured to:
    receive, from a user, a first input specifying one or more first event detection parameters defining mechanical motion sensing of a heart of a patient by one or more motion sensors of an implantable medical device (IMD);
    control the IMD to perform mechanical motion sensing of the heart of the patient in accordance with the one or more first event detection parameters;
    obtain first mechanical motion data of the heart of the patient sensed in accordance with the one or more first event detection parameters;
    determine that the first mechanical motion data comprises an asynchronous atrioventricular (AV) signal;
    in response to determining that the first mechanical motion data comprises the asynchronous AV signal, receive a second input specifying one or more second event detection parameters;
    obtain second mechanical motion data of the heart of the patient sensed in accordance with the one or more second event detection parameters;
    determine that the second mechanical motion data comprises a synchronous AV signal; and
    in response to determining that the second mechanical motion data comprises the synchronous AV signal, control the IMD to deliver cardiac pacing therapy based on the second mechanical motion data of the heart of the patient sensed in accordance with the one or more second event detection parameters.

17. The medical device of claim 16, further comprising a display configured to:
    display a first representation of at least one of electrocardiogram data or electrogram data of the heart of the patient; and
    display a second representation of the second mechanical motion data of the heart of the patient,
    wherein the first representation and second representation are displayed with respect to a shared axis, the shared axis representing time.

18. The medical device of claim 16, wherein the second input specifying the one or more second event detection parameters comprises an input specifying a threshold amplitude of a window for sensing an A7 event, wherein the A7 event corresponds to a fusion of an A3 event and an A4 event, the A3 event corresponds to ventricular mechanical diastole of the heart of the patient, and the A4 event corresponds to atrial mechanical systole of the heart of the patient.

19. The medical device of claim 16, wherein the second input specifying the one or more second event detection parameters comprises an input specifying a threshold amplitude of a window for sensing an A4 event, wherein the A4 event corresponds to atrial mechanical systole of the heart of the patient.

20. The medical device of claim 16, wherein the second input specifying the one or more second event detection parameters comprises an input specifying at least one of:
   a boundary separating a window for sensing an A7 event from a window for sensing an A4 event;
   an end of a window for sensing an A7 event; or
   a beginning of a window for sensing an A4 event,
   wherein the A7 event corresponds to a fusion of an A3 event and an A4 event, the A3 event corresponds to ventricular mechanical diastole of the heart of the patient, and the A4 event corresponds to atrial mechanical systole of the heart of the patient.

21. The medical device of claim 16, wherein the processing circuitry is further configured to transmit instructions to the IMD configured to cause the IMD to store the one or more second event detection parameters permanently in a memory of the IMD.

22. The medical device of claim 16, wherein the processing circuitry is further configured to output, for display to the user, an indication that the first input specifying the one or more first event detection parameters specifies one or more incompatible event detection parameters.

23. The medical device of claim 16, wherein receiving the second input specifying the one or more second event detection parameters comprises:
   receiving a third input specifying a first threshold amplitude of a first window for sensing an A4 event, wherein the A4 event corresponds to atrial mechanical systole of the heart of the patient;
   receiving a fourth input specifying a second threshold amplitude of a second window for sensing an A7 event, wherein the A7 event corresponds to a fusion of an A3 event and an A4 event, and wherein the A3 event corresponds to ventricular mechanical diastole of the heart of the patient; and
   receiving a fifth input specifying at least one of:
      a boundary separating the second window for sensing an A7 event from the first window for sensing an A4 event;
      an end of the second window for sensing an A7 event; or
      a beginning of the second window for sensing an A7 event.

24. The medical device of claim 16, wherein receiving the second input specifying the one or more second event detection parameters comprises:
   receiving a third input specifying a first threshold amplitude of a first window for sensing an A4 event, wherein the A4 event corresponds to atrial mechanical systole of the heart of the patient; and
   receiving a fourth input specifying a second threshold amplitude of a second window for sensing an A7 event, wherein the A7 event corresponds to a fusion of an A3 event and an A4 event, and wherein the A3 event corresponds to ventricular mechanical diastole of the heart of the patient.

25. A non-transitory, computer-readable medium comprising instructions that, when executed, are configured to cause processing circuitry to:
   receive, from a user, a first input specifying one or more first event detection parameters defining mechanical motion sensing of a heart of a patient by one or more motion sensors of an implantable medical device (IMD);
   control the IMD to perform mechanical motion sensing of the heart of the patient in accordance with the one or more first event detection parameters;
   obtain first mechanical motion data of the heart of the patient sensed in accordance with the one or more first event detection parameters;
   determine that the first mechanical motion data comprises an asynchronous atrioventricular (AV) signal;
   in response to determining that the first mechanical motion data comprises the asynchronous AV signal, receive a second input specifying one or more second event detection parameters;
   obtain second mechanical motion data of the heart of the patient sensed in accordance with the one or more second event detection parameters;
   determine that the second mechanical motion data comprises a synchronous AV signal; and
   in response to determining that the second mechanical motion data comprises the synchronous AV signal, control the IMD to deliver cardiac pacing therapy based on the second mechanical motion data of the heart of the patient sensed in accordance with the one or more second event detection parameters.

* * * * *